US012579874B2

(12) United States Patent
Ramanasankaran et al.

(10) Patent No.: US 12,579,874 B2
(45) Date of Patent: Mar. 17, 2026

(54) SYSTEMS AND METHODS FOR BUILDING SURVEILLANCE RE-IDENTIFICATION BASED ON A BUILDING GRAPH

(71) Applicant: Tycore Fire & Security GmbH, Neuhausen am Rheinfall (CH)

(72) Inventors: Rajiv Ramanasankaran, San Jose, CA (US); Santle Camilus Kulandai Samy, Sunnyvale, CA (US); Ambuj Shatdal, Madison, WI (US); Erik S. Paulson, Madison, WI (US); Lipphei Adam, Milwaukee, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 578 days.

(21) Appl. No.: 17/991,166

(22) Filed: Nov. 21, 2022

(65) Prior Publication Data

US 2023/0162580 A1 May 25, 2023

Related U.S. Application Data

(60) Provisional application No. 63/282,667, filed on Nov. 23, 2021.

(51) Int. Cl.
G08B 13/196 (2006.01)
G05B 15/02 (2006.01)

(52) U.S. Cl.
CPC ....... G08B 13/19645 (2013.01); G05B 15/02 (2013.01); G08B 13/19604 (2013.01)

(58) Field of Classification Search
None
See application file for complete search history.

(56) References Cited

U.S. PATENT DOCUMENTS

| | | | |
|---|---|---|---|
| 5,301,109 A | 4/1994 | Landauer et al. | |
| 5,446,677 A | 8/1995 | Jensen et al. | |
| 5,581,478 A | 12/1996 | Cruse et al. | |
| 5,812,962 A | 9/1998 | Kovac | |
| 5,960,381 A | 9/1999 | Singers et al. | |

(Continued)

FOREIGN PATENT DOCUMENTS

| | | |
|---|---|---|
| AU | 2019226217 A1 | 11/2020 |
| AU | 2019226264 A1 | 11/2020 |

(Continued)

OTHER PUBLICATIONS

Translation CN 108234961 (Year: 2020).*

(Continued)

*Primary Examiner* — Ricky Chin
(74) *Attorney, Agent, or Firm* — Foley & Lardner LLP

(57) ABSTRACT

A building system can operate to receive a request to generate a video tracking movement of an entity throughout the building. The building system can operate to search, based on a building graph, a database for a set of images or videos of cameras of the building that track the entity throughout the building. The building graph can include nodes indicating spaces of the building and the cameras of the building. The building graph can include building graph including edges between the nodes representing relationships between the spaces and the cameras. The building system can operate to join the set of images or videos together to create the video.

17 Claims, 12 Drawing Sheets

(56)                    References Cited

U.S. PATENT DOCUMENTS

| | | | |
|---|---|---|---|
| 5,973,662 | A | 10/1999 | Singers et al. |
| 6,014,612 | A | 1/2000 | Larson et al. |
| 6,031,547 | A | 2/2000 | Kennedy |
| 6,134,511 | A | 10/2000 | Subbarao |
| 6,157,943 | A | 12/2000 | Meyer |
| 6,285,966 | B1 | 9/2001 | Brown et al. |
| 6,363,422 | B1 | 3/2002 | Hunter et al. |
| 6,385,510 | B1 | 5/2002 | Hoog et al. |
| 6,389,331 | B1 | 5/2002 | Jensen et al. |
| 6,401,027 | B1 | 6/2002 | Xu et al. |
| 6,437,691 | B1 | 8/2002 | Sandelman et al. |
| 6,477,518 | B1 | 11/2002 | Li et al. |
| 6,487,457 | B1 | 11/2002 | Hull et al. |
| 6,493,755 | B1 | 12/2002 | Hansen et al. |
| 6,577,323 | B1 | 6/2003 | Jamieson et al. |
| 6,626,366 | B2 | 9/2003 | Kayahara et al. |
| 6,646,660 | B1 | 11/2003 | Patty |
| 6,704,016 | B1 | 3/2004 | Oliver et al. |
| 6,732,540 | B2 | 5/2004 | Sugihara et al. |
| 6,764,019 | B1 | 7/2004 | Kayahara et al. |
| 6,782,385 | B2 | 8/2004 | Natsumeda et al. |
| 6,813,532 | B2 | 11/2004 | Eryurek et al. |
| 6,816,811 | B2 | 11/2004 | Seem |
| 6,823,680 | B2 | 11/2004 | Jayanth |
| 6,826,454 | B2 | 11/2004 | Sulfstede |
| 6,865,511 | B2 | 3/2005 | Frerichs et al. |
| 6,925,338 | B2 | 8/2005 | Eryurek et al. |
| 6,986,138 | B1 | 1/2006 | Sakaguchi et al. |
| 7,031,880 | B1 | 4/2006 | Seem et al. |
| 7,401,057 | B2 | 7/2008 | Eder |
| 7,552,467 | B2 | 6/2009 | Lindsay |
| 7,627,544 | B2 | 12/2009 | Chkodrov et al. |
| 7,818,249 | B2 | 10/2010 | Lovejoy et al. |
| 7,889,051 | B1 | 2/2011 | Billig et al. |
| 7,996,488 | B1 | 8/2011 | Casabella et al. |
| 8,078,330 | B2 | 12/2011 | Brickfield et al. |
| 8,104,044 | B1 | 1/2012 | Scofield et al. |
| 8,229,470 | B1 | 7/2012 | Ranjan et al. |
| 8,401,991 | B2 | 3/2013 | Wu et al. |
| 8,495,745 | B1 | 7/2013 | Schrecker et al. |
| 8,516,016 | B2 | 8/2013 | Park et al. |
| 8,532,808 | B2 | 9/2013 | Drees et al. |
| 8,532,839 | B2 | 9/2013 | Drees et al. |
| 8,600,556 | B2 | 12/2013 | Nesler et al. |
| 8,635,182 | B2 | 1/2014 | Mackay |
| 8,682,921 | B2 | 3/2014 | Park et al. |
| 8,731,724 | B2 | 5/2014 | Drees et al. |
| 8,737,334 | B2 | 5/2014 | Ahn et al. |
| 8,738,334 | B2 | 5/2014 | Jiang et al. |
| 8,751,487 | B2 | 6/2014 | Byrne et al. |
| 8,788,097 | B2 | 7/2014 | Drees et al. |
| 8,805,995 | B1 | 8/2014 | Oliver |
| 8,843,238 | B2 | 9/2014 | Wenzel et al. |
| 8,874,071 | B2 | 10/2014 | Sherman et al. |
| 8,941,465 | B2 | 1/2015 | Pineau et al. |
| 8,990,127 | B2 | 3/2015 | Taylor |
| 9,070,113 | B2 | 6/2015 | Shafiee et al. |
| 9,116,978 | B2 | 8/2015 | Park et al. |
| 9,185,095 | B1 | 11/2015 | Moritz et al. |
| 9,189,527 | B2 | 11/2015 | Park et al. |
| 9,196,009 | B2 | 11/2015 | Drees et al. |
| 9,229,966 | B2 | 1/2016 | Aymeloglu et al. |
| 9,286,582 | B2 | 3/2016 | Drees et al. |
| 9,311,807 | B2 | 4/2016 | Schultz et al. |
| 9,344,751 | B1 | 5/2016 | Ream et al. |
| 9,354,968 | B2 | 5/2016 | Wenzel et al. |
| 9,507,686 | B2 | 11/2016 | Horn et al. |
| 9,524,594 | B2 | 12/2016 | Ouyang et al. |
| 9,558,196 | B2 | 1/2017 | Johnston et al. |
| 9,652,813 | B2 | 5/2017 | Gifford et al. |
| 9,753,455 | B2 | 9/2017 | Drees |
| 9,811,249 | B2 | 11/2017 | Chen et al. |
| 9,838,844 | B2 | 12/2017 | Emeis et al. |
| 9,886,478 | B2 | 2/2018 | Mukherjee |
| 9,948,359 | B2 | 4/2018 | Horton |
| 10,055,114 | B2 | 8/2018 | Shah et al. |
| 10,055,206 | B2 | 8/2018 | Park et al. |
| 10,116,461 | B2 | 10/2018 | Fairweather et al. |
| 10,169,454 | B2 | 1/2019 | Ait-Mokhtar et al. |
| 10,171,297 | B2 | 1/2019 | Stewart et al. |
| 10,171,586 | B2 | 1/2019 | Shaashua et al. |
| 10,187,258 | B2 | 1/2019 | Nagesh et al. |
| 10,514,963 | B2 | 12/2019 | Shrivastava et al. |
| 10,515,098 | B2 | 12/2019 | Park et al. |
| 10,534,326 | B2 | 1/2020 | Sridharan et al. |
| 10,536,295 | B2 | 1/2020 | Fairweather et al. |
| 10,564,993 | B2 | 2/2020 | Deutsch et al. |
| 10,705,492 | B2 | 7/2020 | Harvey |
| 10,708,078 | B2 | 7/2020 | Harvey |
| 10,760,815 | B2 | 9/2020 | Janakiraman et al. |
| 10,762,475 | B2 | 9/2020 | Song et al. |
| 10,824,120 | B2 | 11/2020 | Ahmed |
| 10,845,771 | B2 | 11/2020 | Harvey |
| 10,854,194 | B2 | 12/2020 | Park et al. |
| 10,862,928 | B1 | 12/2020 | Badawy et al. |
| 10,921,760 | B2 | 2/2021 | Harvey |
| 10,921,972 | B2 | 2/2021 | Park et al. |
| 10,969,133 | B2 | 4/2021 | Harvey |
| 10,986,121 | B2 | 4/2021 | Stockdale et al. |
| 11,016,998 | B2 | 5/2021 | Park et al. |
| 11,024,292 | B2 | 6/2021 | Park et al. |
| 11,038,709 | B2 | 6/2021 | Park et al. |
| 11,041,650 | B2 | 6/2021 | Li et al. |
| 11,054,796 | B2 | 7/2021 | Holaso |
| 11,070,390 | B2 | 7/2021 | Park et al. |
| 11,073,976 | B2 | 7/2021 | Park et al. |
| 11,108,587 | B2 | 8/2021 | Park et al. |
| 11,113,295 | B2 | 9/2021 | Park et al. |
| 11,229,138 | B1 | 1/2022 | Harvey et al. |
| 11,314,726 | B2 | 4/2022 | Park et al. |
| 11,314,788 | B2 | 4/2022 | Park et al. |
| 11,556,105 | B2 | 1/2023 | Cooley et al. |
| 11,561,522 | B2 | 1/2023 | Cooley et al. |
| 11,561,523 | B2 | 1/2023 | Cooley et al. |
| 11,573,551 | B2 | 2/2023 | Cooley et al. |
| 11,586,167 | B2 | 2/2023 | Cooley et al. |
| 2002/0010562 | A1 | 1/2002 | Schleiss et al. |
| 2002/0016639 | A1 | 2/2002 | Smith et al. |
| 2002/0059229 | A1 | 5/2002 | Natsumeda et al. |
| 2002/0123864 | A1 | 9/2002 | Eryurek et al. |
| 2002/0147506 | A1 | 10/2002 | Eryurek et al. |
| 2002/0177909 | A1 | 11/2002 | Fu et al. |
| 2003/0005486 | A1 | 1/2003 | Ridolfo et al. |
| 2003/0014130 | A1 | 1/2003 | Grumelart |
| 2003/0073432 | A1 | 4/2003 | Meade, II |
| 2003/0158704 | A1 | 8/2003 | Triginai et al. |
| 2003/0171851 | A1 | 9/2003 | Brickfield et al. |
| 2003/0200059 | A1 | 10/2003 | Ignatowski et al. |
| 2004/0068390 | A1 | 4/2004 | Saunders |
| 2004/0128314 | A1 | 7/2004 | Katibah et al. |
| 2004/0133314 | A1 | 7/2004 | Ehlers et al. |
| 2004/0199360 | A1 | 10/2004 | Friman et al. |
| 2005/0055308 | A1 | 3/2005 | Meyer et al. |
| 2005/0108262 | A1 | 5/2005 | Fawcett et al. |
| 2005/0154494 | A1 | 7/2005 | Ahmed |
| 2005/0278703 | A1 | 12/2005 | Lo et al. |
| 2005/0283337 | A1 | 12/2005 | Sayal |
| 2006/0095521 | A1 | 5/2006 | Patinkin |
| 2006/0140207 | A1 | 6/2006 | Eschbach et al. |
| 2006/0184479 | A1 | 8/2006 | Levine |
| 2006/0200476 | A1 | 9/2006 | Gottumukkala et al. |
| 2006/0265751 | A1 | 11/2006 | Cosquer et al. |
| 2006/0271589 | A1 | 11/2006 | Horowitz et al. |
| 2007/0028179 | A1 | 2/2007 | Levin et al. |
| 2007/0203693 | A1 | 8/2007 | Estes |
| 2007/0261062 | A1 | 11/2007 | Bansal et al. |
| 2007/0273497 | A1 | 11/2007 | Kuroda et al. |
| 2007/0273610 | A1 | 11/2007 | Baillot |
| 2008/0034425 | A1 | 2/2008 | Overcash et al. |
| 2008/0094230 | A1 | 4/2008 | Mock et al. |
| 2008/0097816 | A1 | 4/2008 | Freire et al. |
| 2008/0186160 | A1 | 8/2008 | Kim et al. |
| 2008/0211909 | A1* | 9/2008 | Loos ............... G08B 13/19613 348/E7.086 |

(56) References Cited

U.S. PATENT DOCUMENTS

| | | |
|---|---|---|
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0172604 A1* | 6/2015 | Kim ..................... G06V 20/40 |
| | | 348/159 |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | Mcfarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0189500 A1* | 6/2016 | Kim ................. G08B 13/19608 |
| | | 386/223 |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |

(56) References Cited

U.S. PATENT DOCUMENTS

| | | |
|---|---|---|
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0221219 A1* | 8/2017 | Cho ..................... H04N 23/661 |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2019/0377306 A1 | 12/2019 | Harvey |
| 2020/0082206 A1 | 3/2020 | Jin et al. |
| 2020/0226156 A1 | 7/2020 | Borra et al. |
| 2020/0234057 A1* | 7/2020 | Koo ..................... H04L 12/2803 |
| 2020/0285203 A1 | 9/2020 | Thakur et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |

| | | |
|---|---|---|
| 2021/0065407 A1* | 3/2021 | Trim ..................... G06V 10/44 |
| 2021/0325070 A1 | 10/2021 | Endel et al. |
| 2021/0342961 A1 | 11/2021 | Winter et al. |
| 2021/0374971 A1* | 12/2021 | Zhou ..................... G06F 18/22 |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2021/0409790 A1* | 12/2021 | Larrew ............. H04N 21/4223 |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0171970 A1* | 6/2022 | Yadav ..................... G06V 20/40 |
| 2022/0215264 A1 | 7/2022 | Harvey et al. |
| 2022/0406065 A1* | 12/2022 | Kang ..................... G06T 7/292 |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |
| 2023/0162580 A1* | 5/2023 | Ramanasankaran ........................ G08B 13/19608 348/159 |
| 2023/0252654 A1* | 8/2023 | Kamiya .................. G06T 7/246 382/103 |
| 2024/0155221 A1* | 5/2024 | Watanabe ............. H04N 23/90 |
| 2025/0046084 A1* | 2/2025 | Yadav .................. H04N 23/695 |

FOREIGN PATENT DOCUMENTS

| | | | | |
|---|---|---|---|---|
| CN | 101415011 A | 4/2009 | | |
| CN | 102136099 A | 7/2011 | | |
| CN | 102136100 A | 7/2011 | | |
| CN | 102650876 A | 8/2012 | | |
| CN | 104040583 A | 9/2014 | | |
| CN | 104603832 A | 5/2015 | | |
| CN | 104919484 A | 9/2015 | | |
| CN | 106204392 A | 12/2016 | | |
| CN | 106406806 A | 2/2017 | | |
| CN | 106960269 A | 7/2017 | | |
| CN | 107147639 A1 | 9/2017 | | |
| CN | 107598928 A | 1/2018 | | |
| CN | 106096577 B | * 5/2019 | ............. G06V 20/46 | |
| CN | 106295594 B | * 10/2019 | ............. H04N 7/181 | |
| CN | 108234961 B | * 10/2020 | ............. H04N 7/181 | |
| EP | 2 528 033 A1 | 11/2012 | | |
| EP | 3 268 821 B1 | 1/2018 | | |
| EP | 3 324 306 A1 | 5/2018 | | |
| EP | 4 226 263 A1 | 8/2023 | | |
| JP | H10-049552 A | 2/1998 | | |
| JP | 2003-162573 A | 6/2003 | | |
| JP | 2007-018322 A | 1/2007 | | |
| JP | 4073946 B1 | 4/2008 | | |
| JP | 2008-107930 A | 5/2008 | | |
| JP | 2013-152618 A | 8/2013 | | |
| JP | 2014-044457 A | 3/2014 | | |
| KR | 2016/0102923 A | 8/2016 | | |
| WO | WO-2009/020158 A1 | 2/2009 | | |
| WO | WO-2011/100255 A2 | 8/2011 | | |
| WO | WO-2013/050333 A1 | 4/2013 | | |
| WO | WO-2015/106702 A1 | 7/2015 | | |

(56) References Cited

FOREIGN PATENT DOCUMENTS

| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2020/061621 A1 | 4/2020 |
| WO | WO-2022/042925 A1 | 3/2022 |
| WO | WO-2022/103812 A1 | 5/2022 |
| WO | WO-2022/103813 A1 | 5/2022 |
| WO | WO-2022/103820 A1 | 5/2022 |
| WO | WO-2022/103822 A1 | 5/2022 |
| WO | WO-2022/103824 A1 | 5/2022 |
| WO | WO-2022/103829 A1 | 5/2022 |
| WO | WO-2022/103831 A1 | 5/2022 |

OTHER PUBLICATIONS

Balaji et al, "Brick: Metadata schema for portable smart building applications," Applied Energy, 2018 (20 pages).

Balaji et al, "Brick: Metadata schema for portable smart building applications," Applied Energy, Sep. 15, 2018, 3 pages, (Abstract).

Balaji et al, "Demo Abstract: Portable Queries Using the Brick Schema for Building Applications," BuildSys '16, Palo Alto, CA, USA, Nov. 16-17, 2016 (2 pages).

Balaji, B. et al., "Brick: Towards a Unified Metadata Schema For Buildings." BuildSys '16, Palo Alto, CA, USA, Nov. 16-17, 2016 (10 pages).

Bhattacharya et al., "Short Paper: Analyzing Metadata Schemas for Buildings—The Good, The Bad and The Ugly," BuildSys '15, Seoul, South Korea, Nov. 4-5, 2015 (4 pages).

Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).

Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).

Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).

Brick, "Metadata Schema for Buildings," URL: https://brickschema.org/docs/Brick-Leaflet.pdf, retrieved from internet Dec. 24, 2019 (3 pages).

Chinese Office Action on CN Appl. No. 201780003995.9 dated Apr. 8, 2021 (21 pages with English language translation).

Chinese Office action on CN Appl. No. 201780043400.2 dated Apr. 25, 2021 (15 pages with English language translation).

Curry, E. et al., "Linking building data in the cloud: Integrating cross-domain building data using linked data." Advanced Engineering Informatics, 2013, 27 (pp. 206-219).

Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).

Digital Platform Litigation Documents Part 10, includes DDE-1-21-cv-01796 (documents filed Nov. 1, 2022-Dec. 22, 2021 (1795 pages total).

Digital Platform Litigation Documents Part 2, includes IPR2023-00085 (documents filed Oct. 20, 2022) (172 pages total).

Digital Platform Litigation Documents Part 3, includes IPR2023-00085 (documents filed Oct. 20, 2022) and IPR2023-00170 (documents filed Nov. 28, 2022-Nov. 7, 2022) (397 pages total).

Digital Platform Litigation Documents Part 4, includes IPR2023-00170 (documents filed Nov. 7, 2022) and IPR2023-00217 (documents filed Jan. 18, 2023-Nov. 15, 2022) (434 pages total).

Digital Platform Litigation Documents Part 5, includes IPR2023-00217 (documents filed Nov. 15, 2022) and IPR2023-00257 (documents filed Jan. 25, 2023-Nov. 23, 2022) (316 pages total).

Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).

Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).

Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).

Digital Platform Litigation Documents Part 9, includes DDE-1-21-cv-01796 (documents filed Jan. 10, 2023-Nov. 1, 2022 (203 pages total).

El Kaed, C. et al., "Building management insights driven by a multi-system semantic representation approach," 2016 IEEE 3rd World Forum on Internet of Things (WF-IoT), Dec. 12-14, 2016, (pp. 520-525).

Ellis, C. et al., "Creating a room connectivity graph of a building from per-room sensor units." BuildSys '12, Toronto, ON, Canada, Nov. 6, 2012 (7 pages).

Extended European Search Report on EP Application No. 18196948.6 dated Apr. 10, 2019 (9 pages).

Fierro et al., "Beyond a House of Sticks: Formalizing Metadata Tags with Brick," BuildSys '19, New York, NY, USA, Nov. 13-14, 2019 (10 pages).

Fierro et al., "Dataset: An Open Dataset and Collection Tool for BMS Point Labels," DATA'19, New York, NY, USA, Nov. 10, 2019 (3 pages).

Fierro et al., "Design and Analysis of a Query Processor for Brick," ACM Transactions on Sensor Networks, Jan. 2018, vol. 1, No. 1, art. 1 (25 pages).

Fierro et al., "Design and Analysis of a Query Processor for Brick," BuildSys '17, Delft, Netherlands, Nov. 8-9, 2017 (10 pages).

Fierro et al., "Mortar: An Open Testbed for Portable Building Analytics," BuildSys '18, Shenzhen, China, Nov. 7-8, 2018 (10 pages).

Fierro et al., "Why Brick is a Game Changer for Smart Buildings," URL: https://brickschema.org/papers/Brick_Memoori_Webinar_Presentation.pdf, Memoori Webinar, 2019 (67 pages).

Fierro, "Writing Portable Building Analytics with the Brick Metadata Schema," UC Berkeley, ACM E-Energy, 2019 (39 pages).

Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).

File History for U.S. Appl. No. 12/776,159, filed May 7, 2010 (722 pages).

Final Conference Program, ACM BuildSys 2016, Stanford, CA, USA, Nov. 15-17, 2016 (7 pages).

Gao et al., "A large-scale evaluation of automated metadata inference approaches on sensors from air handling units," Advanced Engineering Informatics, 2018, 37 (pp. 14-30).

Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).

Harvey, T., "Quantum: The Digital Twin Standard for Buildings," URL: https://www.automatedbuildings.com/news/feb21/articles/passivelogic/210127124501passivelogic.html, Feb. 2021 (6 pages).

Hu, S. et al., "Building performance optimisation: A hybrid architecture for the integration of contextual information and time-series data," Automation in Construction, 2016, 70 (pp. 51-61).

International Search Report and Written Opinion for PCT Appl. Ser. No. PCT/US2017/013831 dated Mar. 31, 2017 (14 pages).

International Search Report and Written Opinion for PCT Appl. Ser. No. PCT/US2017/035524 dated Jul. 24, 2017 (14 pages).

International Search Report and Written Opinion on PCT/US2017/052060, mailed Oct. 5, 2017, 11 pages.

(56)                References Cited

OTHER PUBLICATIONS

International Search Report and Written Opinion on PCT/US2017/052633, mailed Oct. 23, 2017, 9 pages.

International Search Report and Written Opinion on PCT/US2017/052829, mailed Nov. 27, 2017, 24 pages.

International Search Report and Written Opinion on PCT/US2018/024068, mailed Jun. 15, 2018, 22 pages.

International Search Report and Written Opinion on PCT/US2018/052971, dated Mar. 1, 2019, 19 pages.

International Search Report and Written Opinion on PCT/US2018/052974, mailed Dec. 19, 2018, 13 pages.

International Search Report and Written Opinion on PCT/US2018/052975, mailed Jan. 2, 2019, 13 pages.

International Search Report and Written Opinion on PCT/US2018/052994, mailed Jan. 7, 2019, 15 pages.

International Search Report and Written Opinion on PCT/US2019/015481, dated May 17, 2019, 78 pages.

International Search Report and Written Opinion on PCT/US2020/058381, dated Jan. 27, 2021, 30 pages.

Japanese Office Action on JP Appl. No. 2018-534963 dated May 11, 2021 (16 pages with English language translation).

Koh et al., "Plaster: An Integration, Benchmark, and Development Framework for Metadata Normalization Methods," BuildSys '18, Shenzhen, China, Nov. 7-8, 2018 (10 pages).

Koh et al., "Scrabble: Transferrable Semi-Automated Semantic Metadata Normalization using Intermediate Representation," BuildSys '18, Shenzhen, China, Nov. 7-8, 2018 (10 pages).

Koh et al., "Who can Access What, and When?" BuildSys '19, New York, NY, USA, Nov. 13-14, 2019 (4 pages).

Li et al., "Event Stream Processing with Out-of-Order Data Arrival," International Conferences on Distributed Computing Systems, 2007, (8 pages).

Nissin Electric Co., Ltd., "Smart power supply system (SPSS)," Outline of the scale verification plan, Nissin Electric Technical Report, Japan, Apr. 23, 2014, vol. 59, No. 1 (23 pages).

Passivelogic, "Explorer: Digital Twin Standard for Autonomous Systems. Made interactive." URL: https://passivelogic.com/software/quantum-explorer/, retrieved from internet Jan. 4, 2023 (13 pages).

Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).

Quantum Alliance, "Quantum Explorer Walkthrough," 2022, (7 pages) (screenshots from video).

Results of the Partial International Search for PCT/US2018/052971, dated Jan. 3, 2019, 3 pages.

Sinha, Sudhi and Al Huraimel, Khaled, "Reimagining Businesses with AI" John Wiley & Sons, Inc., Hoboken, NJ, USA, 2021 (156 pages).

Sinha, Sudhi R. and Park, Youngchoon, "Building an Effective IoT Ecosystem for Your Business," Johnson Controls International, Springer International Publishing, 2017 (286 pages).

Sinha, Sudhi, "Making Big Data Work For Your Business: A guide to effective Big Data analytics," Impackt Publishing LTD., Birmingham, UK, Oct. 2014 (170 pages).

The Virtual Nuclear Tourist, "Calvert Cliffs Nuclear Power Plant," URL: http://www.nucleartourist.com/us/calvert.htm, Jan. 11, 2006 (2 pages).

University of California At Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).

Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).

W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).

Wei et al., "Development and Implementation of Software Gateways of Fire Fighting Subsystem Running on EBI," Control, Automation and Systems Engineering, IITA International Conference on, IEEE, Jul. 2009 (pp. 9-12).

White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).

Zhou, Q. et al., "Knowledge-infused and Consistent Complex Event Processing over Real-time and Persistent Streams," Further Generation Computer Systems, 2017, 76 (pp. 391-406).

U.S. Appl. No. 17/566,029, filed Not Available, Passivelogic, Inc.

U.S. Appl. No. 17/567,275, filed Not Available, Passivelogic, Inc.

U.S. Appl. No. 17/722,115, filed Not Available, Passivelogic, Inc.

* cited by examiner

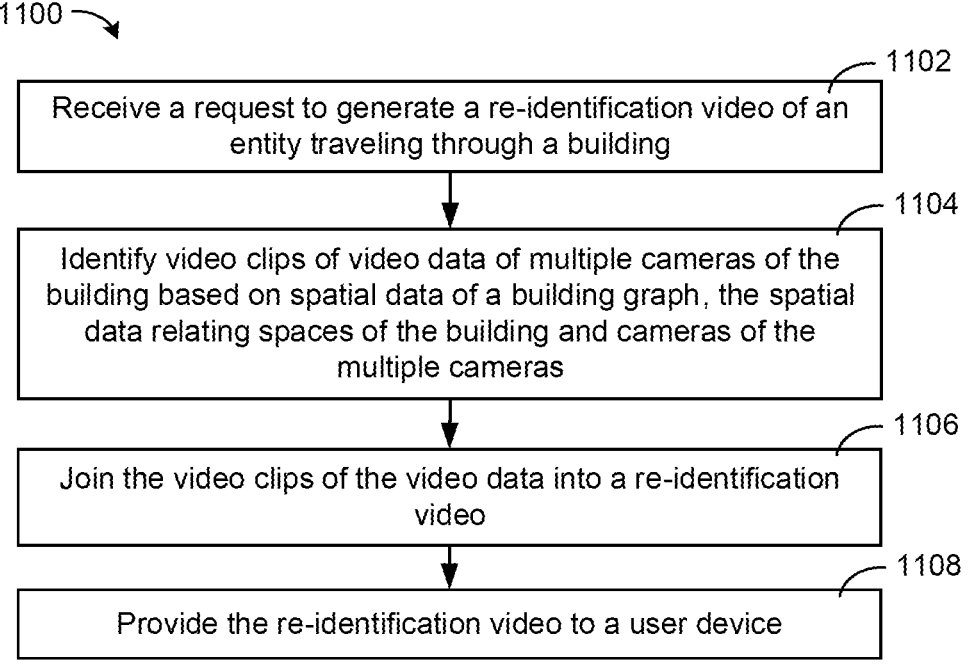

1100

1102
Receive a request to generate a re-identification video of an entity traveling through a building 1104
Identify video clips of video data of multiple cameras of the building based on spatial data of a building graph, the spatial data relating spaces of the building and cameras of the multiple cameras 1106
Join the video clips of the video data into a re-identification video 1108
Provide the re-identification video to a user device

FIG. 11

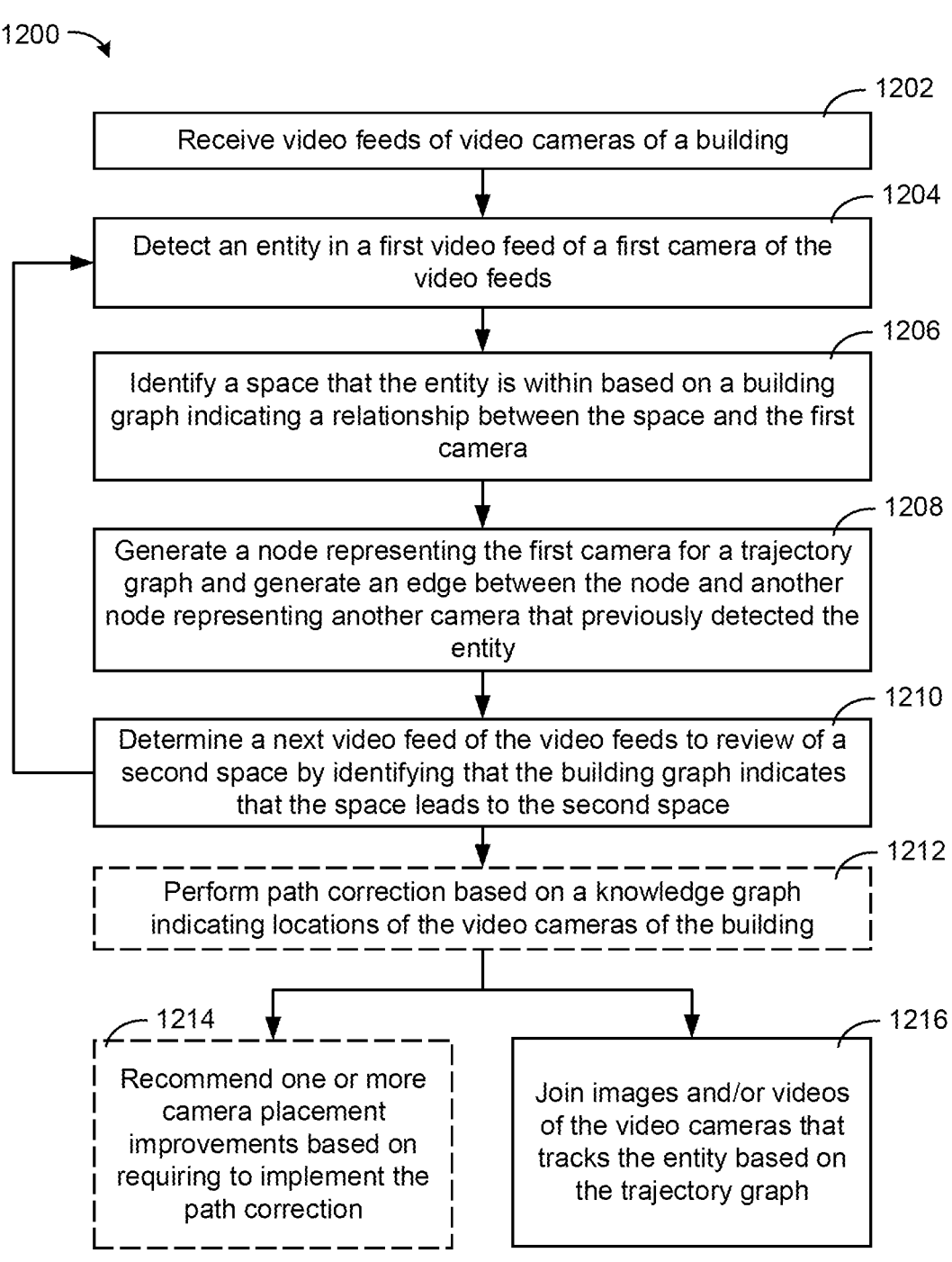

1200

1202
Receive video feeds of video cameras of a building

1204
Detect an entity in a first video feed of a first camera of the video feeds 1206
Identify a space that the entity is within based on a building graph indicating a relationship between the space and the first camera 1208
Generate a node representing the first camera for a trajectory graph and generate an edge between the node and another node representing another camera that previously detected the entity 1210
Determine a next video feed of the video feeds to review of a second space by identifying that the building graph indicates that the space leads to the second space 1212
Perform path correction based on a knowledge graph indicating locations of the video cameras of the building 1214
Recommend one or more camera placement improvements based on requiring to implement the path correction 1216
Join images and/or videos of the video cameras that tracks the entity based on the trajectory graph

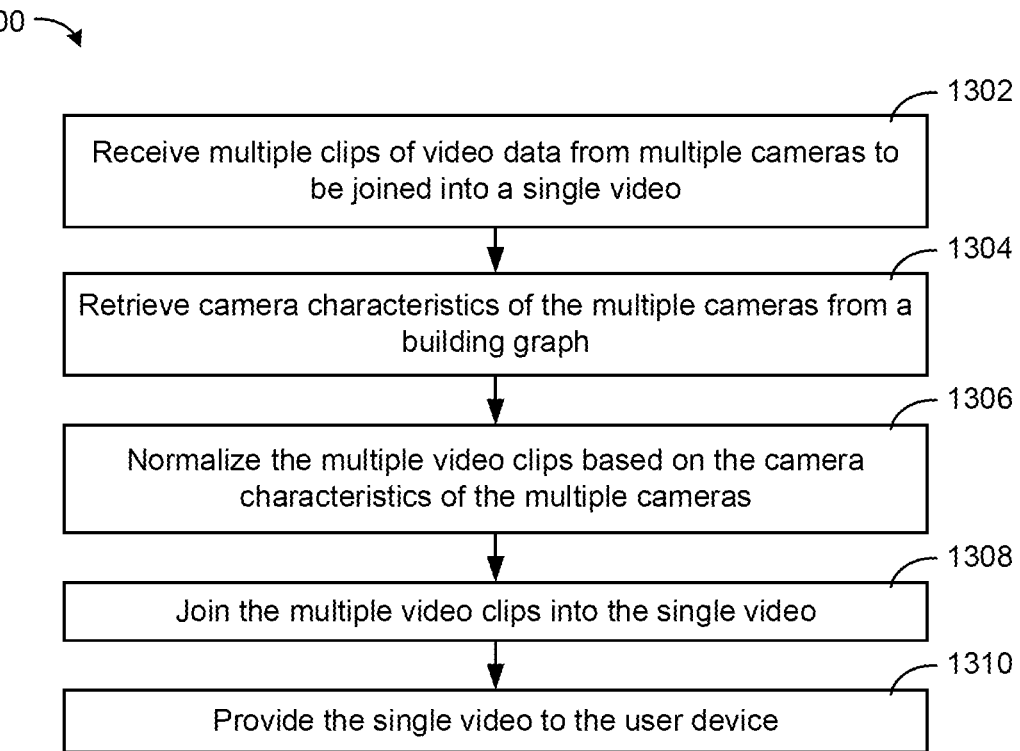

1302

Receive multiple clips of video data from multiple cameras to be joined into a single video

1304

Retrieve camera characteristics of the multiple cameras from a building graph

1306

Normalize the multiple video clips based on the camera characteristics of the multiple cameras

1308

Join the multiple video clips into the single video

1310

Provide the single video to the user device

FIG. 13

SYSTEMS AND METHODS FOR BUILDING SURVEILLANCE RE-IDENTIFICATION BASED ON A BUILDING GRAPH

CROSS-REFERENCE TO RELATED PATENT APPLICATION

This application claims the benefit of, and priority to, U.S. Provisional Patent Application No. 63/282,667 filed Nov. 23, 2021, the entirety of which is incorporated by reference herein.

BACKGROUND

This application relates generally to a surveillance system of a building. This application relates more particularly to a surveillance system for re-identification of an entity.

A building system can perform forensic video searching and/or analysis to stitch videos together to show a path that a particular person took inside a building. However, some systems and methods for performing the video stitching are crude and resource intensive. It may be time consuming to inspect all video clips of a surveillance system. Often, important details may be overlooked by such a system. A system or user may need to review hundreds of hours of surveillance video to identify a user in the videos. Furthermore, in some cases, it may be expensive to place cameras throughout a premises such that regions of the building are overlapping. Furthermore, the video that is stitched together may originates from a variety of different surveillance cameras, with different resolutions, frame rates, camera angles, brightness levels, etc.

SUMMARY

One implementation of the present disclosure is a building system of a building comprising one or more memory devices storing instructions thereon that, when executed by one or more processors, cause the one or more processors to receive a request to generate a video tracking movement of an entity throughout the building. The building system can search, based on a building graph, a database for a set of images or videos of a plurality of cameras of the building that track the entity throughout the building, the building graph comprising a plurality of nodes indicating a plurality of spaces of the building and the plurality of cameras of the building, the building graph comprising a plurality of edges between the plurality of nodes representing relationships between the plurality of spaces and the plurality of cameras. The building system can join the set of images or videos together to create the video.

In some embodiments, the nodes indicate equipment, people, or events of the building. In some embodiments, the edges represent relationships between the equipment, the people, or the events of the building.

In some embodiments, the instructions cause the one or more processors to generate a trajectory graph based on the building graph and a plurality of images or videos of the database, the trajectory graph indicating a path of the entity through the building, the trajectory graph including a plurality of nodes and a plurality of edges, wherein the plurality of nodes represent the plurality of cameras that captured pictures of the entity or filmed the entity, the plurality of edges indicating an order in which the plurality of cameras captured the pictures of the entity or filmed the entity. In some embodiments, the instructions cause the one or more processors to search the database for the set of images or videos based on the trajectory graph.

In some embodiments, the instructions cause the one or more processors to identify a set of cameras of the plurality of cameras associated with the set of images or videos. In some embodiments, the instructions cause the one or more processors to identify a set of nodes of the building graph representing the set of cameras, identify camera characteristics of the set of cameras by identifying edges of the plurality of edges linking the set of nodes to nodes representing the camera characteristics, and normalize the set of images or videos based on the camera characteristics of the set of cameras.

In some embodiments, the request to generate the video tracking movement of the entity throughout the building is at least one of a user request of a user device requesting the video tracking movement of the entity throughout the building be generated or a request generated responsive to a security event involving the entity occurring within the building.

In some embodiments, the instructions cause the one or more processors to search the database for the set of images or videos of the plurality of images or videos of the plurality of cameras of the building by identifying one or more first videos or images of a first camera of the plurality of cameras stored in the database, the one or more first videos or images including the entity, the first camera surveilling a first space of the building, identifying a second space of the building connected to the first space based on the building graph, identifying a second camera of the plurality of cameras surveilling the second space of the building based on the building graph, selecting one or more second videos or images of the second camera stored in the database responsive to identifying the second camera, and identifying the entity within the one or more second videos or images of the second camera indicating that the entity moved from the first space to the second space. In some embodiments, the instructions cause the one or more processors to join the one or more first videos or images and the one or more second videos or images to create the video.

In some embodiments, the instructions cause the one or more processors to generate a trajectory graph by causing the trajectory graph to include a first node representing the first camera of the plurality of cameras in response to identifying the one or more first videos or images of the first camera of the plurality of cameras including the entity and causing the trajectory graph to include a second node and an edge between the first node and the second node indicating that the entity has moved from a field of view of the first camera to a field of view of the second camera in response identifying the entity is within the one or more second videos or images of the second camera.

In some embodiments, the instructions cause the one or more processors to identify, based on the building graph, a camera not represented in the trajectory graph that includes a field of view that captures a portion of a path the entity traveled on, update the trajectory graph to include a node representing the camera, and join the set of images or videos together with images or videos of the camera to create the video.

In some embodiments, the instructions cause the one or more processors to determine at least one of a starting time or an ending time for the images or videos by identifying a speed of the entity based on a length of time the entity takes to move across at least a portion of the field of view of the first camera and determining at least one of the starting time or the ending time based on the speed of the entity.

Another implementation of the present disclosure is a method. The method can include receiving, by one or more processing circuits, a request to generate a video tracking movement of an entity throughout a building. The method can include searching, by the one or more processing circuits, based on a building graph, a database for a set of images or videos of a plurality of cameras of the building that track the entity throughout the building, the building graph comprising a plurality of nodes indicating a plurality of spaces of the building and the plurality of cameras of the building, the building graph comprising a plurality of edges between the plurality of nodes representing relationships between the plurality of spaces and the plurality of cameras. The method can include joining, by the one or more processing circuits, the set of images or videos together to create the video.

In some embodiments, the nodes indicate equipment, people, or events of the building. In some embodiments, the edges represent relationships between the equipment, the people, or the events of the building.

In some embodiments, the method includes generating, by the one or more processing circuits, a trajectory graph based on the building graph and a plurality of images or videos of the database, the trajectory graph indicating a path of the entity through the building, the trajectory graph including a plurality of nodes and a plurality of edges, wherein the plurality of nodes represent the plurality of cameras that captured pictures of the entity or filmed the entity, the plurality of edges indicating an order in which the plurality of cameras captured the pictures of the entity or filmed the entity. In some embodiments, the method includes searching, by the one or more processing circuits, the database for the set of images or videos based on the trajectory graph.

In some embodiments, the method includes identifying, by the one or more processing circuits, a set of cameras of the plurality of cameras associated with the set of images or videos. In some embodiments, the method includes identifying, by the one or more processing circuits, a set of nodes of the building graph representing the set of cameras. In some embodiments, the method includes identifying, by the one or more processing circuits, camera characteristics of the set of cameras by identifying edges of the plurality of edges linking the set of nodes to nodes representing the camera characteristics and normalizing, by the one or more processing circuits, the set of images or videos based on the camera characteristics of the set of cameras.

In some embodiments, the request to generate the video tracking movement of the entity throughout the building is at least one of a user request from a user device requesting the video tracking movement of the entity throughout the building be generated or a request generated responsive to a security event involving the entity occurring within the building.

In some embodiments, the method can include searching, by the one or more processing circuits, the database for the set of images or videos of the plurality of images or videos of the plurality of cameras of the building by identifying one or more first videos or images of a first camera of the plurality of cameras stored in the database, the one or more first videos or images including the entity, the first camera surveilling a first space of the building, identifying a second space of the building connected to the first space based on the building graph, identifying a second camera of the plurality of cameras surveilling the second space of the building based on the building graph, selecting one or more second videos or images of the second camera stored in the database responsive to identifying the second camera, and identifying the entity within the one or more second videos or images of the second camera indicating that the entity moved from the first space to the second space. In some embodiments, the method includes joining, by the one or more processing circuits, the one or more first videos or images and the one or more second videos or images to create the video.

In some embodiments, the method includes generating, by the one or more processing circuits, a trajectory graph by causing the trajectory graph to include a first node representing the first camera of the plurality of cameras in response to identifying the one or more first videos or images of the first camera of the plurality of cameras including the entity and causing the trajectory graph to include a second node and an edge between the first node and the second node indicating that the entity has moved from a field of view of the first camera to a field of view of the second camera in response identifying the entity is within the one or more second videos or images of the second camera.

Another implementation of the present disclosure is a system including one or more memory devices storing instructions thereon that, when executed by one or more processors, cause the one or more processors to receive a request to generate a video tracking movement of an entity throughout an environment. The instructions cause the one or more processors to search, based on a digital twin of the environment, a database for a set of images or videos of a plurality of cameras of the environment that track the entity throughout the environment, the digital twin representing areas of the environment and the plurality of cameras of the environment, the digital twin representing relationships between the plurality of spaces and the plurality of cameras and join the set of images or videos together to create the video.

In some embodiments, the instructions cause the one or more processors to search the database for the set of images or videos of the plurality of images or videos of the plurality of cameras of the environment by identifying one or more first videos or images of a first camera of the plurality of cameras stored in the database, the one or more first videos or images including the entity, the first camera surveilling a first area of the environment, identifying a second area of the environment connected to the first area based on the digital twin, identifying a second camera of the plurality of cameras surveilling the second area of the environment based on the digital twin, selecting one or more second videos or images of the second camera stored in the database responsive to identifying the second camera, and identifying the entity within the one or more second videos or images of the second camera indicating that the entity moved from the first area to the second area. In some embodiments, the instructions cause the one or more processors to join the one or more first videos or images and the one or more second videos or images to create the video.

In some embodiments, the instructions cause the one or more processors to generate a trajectory graph based on the digital twin and a plurality of images or videos of the database, the trajectory graph indicating a path of the entity through the environment, the trajectory graph including a plurality of nodes and a plurality of edges, wherein the plurality of nodes represent the plurality of cameras that captured pictures of the entity or filmed the entity, the plurality of edges indicating an order in which the plurality of cameras captured the pictures of the entity or filmed the entity and search the database for the set of images or videos based on the trajectory graph.

In some embodiments, the instructions cause the one or more processors to identify a set of cameras of the plurality of cameras associated with the set of images or videos, identify a set of nodes of the digital twin representing the set of cameras, identify camera characteristics of the set of cameras by identifying edges of the plurality of edges linking the set of nodes to nodes representing the camera characteristics, and normalizing, by the one or more processing circuits, the set of images or videos based on the camera characteristics of the set of cameras.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 11 is a flow diagram of a process of generating a video tracking an entity within the building by joining multiple videos of multiple cameras together based on the building graph of FIG. 6, according to an exemplary embodiment.

FIG. 12 is a flow diagram of a process of generating a trajectory graph that tracks the movements of a user through a building, according to an exemplary embodiment.

FIG. 13 is a flow diagram of a process of normalizing video clips of multiple videos based on characteristics of cameras stored in the building graph of FIG. 6, according to an exemplary embodiment.

DETAILED DESCRIPTION

Figure 1:
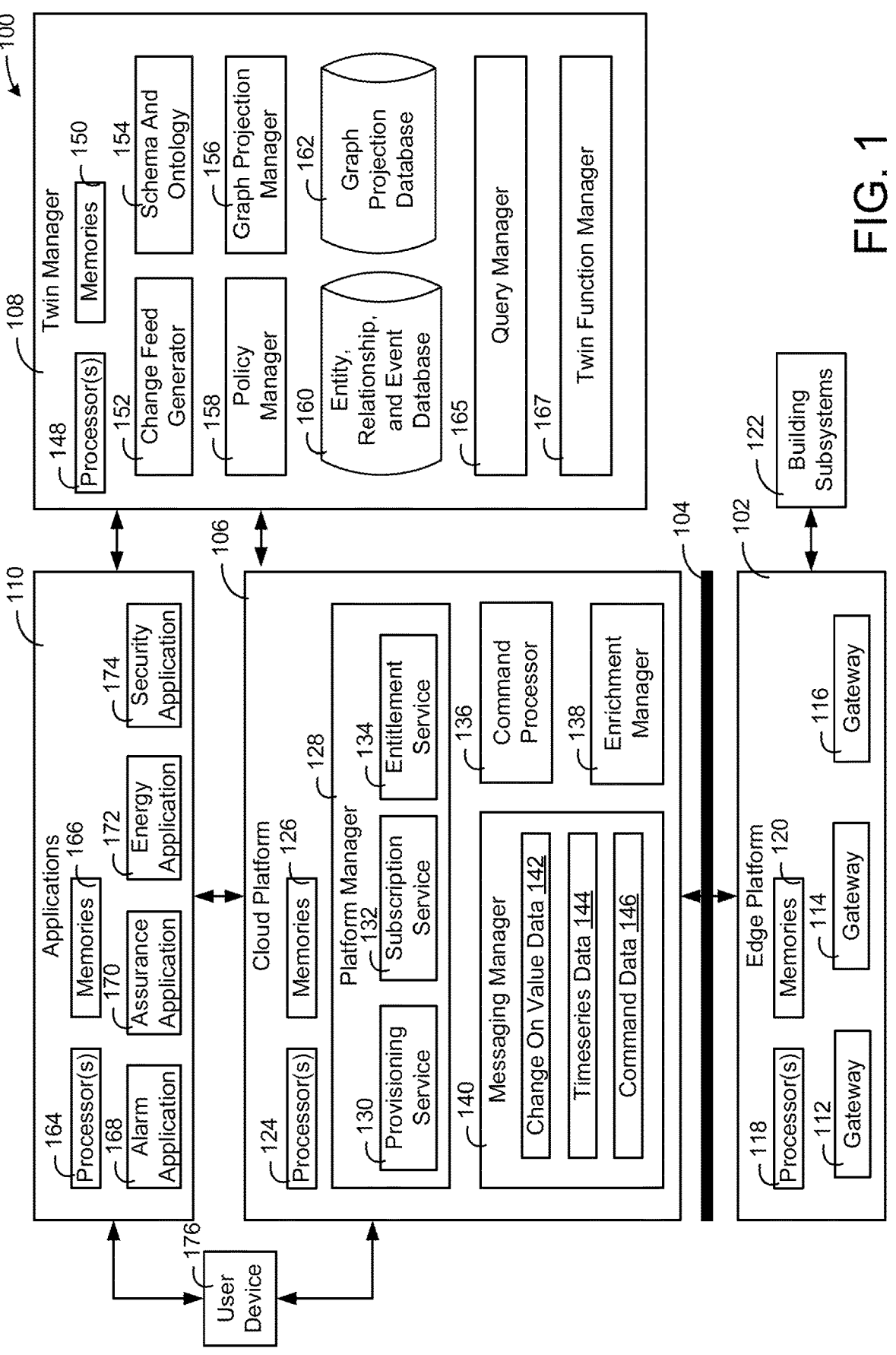
FIG. 1 is a block diagram of a building data platform including an edge platform, a cloud platform, and a twin manager, according to an exemplary embodiment.

Referring generally to the FIGURES, systems and methods for building surveillance re-identification based on a building graph is shown, according to various exemplary embodiments. A building system can be configured to use a building graph to identify video clips of multiple video cameras that track an entity through a building, campus, or geographic area. The entity may be a person, an animal, an object, a group of people, a vehicle, a robot, a drone, a piece of merchandise, etc.

The building system can manage and/or store a building graph that includes nodes and edges representing the relationships between spaces of a building and cameras of the building. In some embodiments, the building graph relates multiple rooms together, indicates what cameras are in each room, indicates what cameras surveil each room, indicates what sensors are present in each room, etc. The building system can use the relational or spatial data between spaces indicated by the building graph to stitch together a video of the entity inside the building from a beginning time (e.g., the moment the entity enters the building) to an ending time (e.g., the moment the object exits the building).

In some embodiments, the building system can perform a search to identify an entity by searching across the various clips of surveillance video and generating a list of all the clips that tracks the entity. In some embodiments, the search analysis is guided by the spatial data of the building graph. The building system can infer spatial context for the video clips based on the building graph. For example, if one clip identifies the entity in a first room, the building system can use the building graph to determine a second room connected to the first room. The building system can identify a second clip for the second room showing the entity. The building system can determine that the user has moved from the first room into the second room, and thus the first clip and the second clip should be ordered such that the first clip occurs first and the second clip occurs second. In some embodiments, the building system can start with an image of an entity, e.g., a face of a user, a body image of a person, an overhead image of a person, an image of the person where their face is not visible, etc. and generate the stitched video tracking the entity.

In some embodiments, the building system can perform the re-identification process to generate the stitched video with a digital twin. The digital twin can include an agent which may be an artificial intelligence entity configured to operate to generate the stitched video. The digital twin can further include a knowledge base, e.g., the building graph. In some embodiments, when there are holes in the data (e.g., the person disappeared in between two clips from two cameras in two difference rooms/spaces), the building system extrapolate the path of the person automatically. In some embodiments, a deep vision artificial intelligence (e.g., an agent of a digital twin) can extrapolate the path to choose the next clip.

In some embodiments, the building system, or the digital twin, can use data from other building subsystems to create and/or confirm the stitched video. For example, the building system could use badge data, biometric data, and/or any other data collected in a building. In some embodiments, the systems and methods described herein can stitch together audio data, photo data, phone geolocation data, and/or video data. In this regard, the systems and methods could stitch together only audio data, only photo data, only phone geolocation data, only video data and/or combinations of audio data, photo data, phone geolocation data, and/or video data.

In some embodiments, the systems and methods can analyze the stitched video data against the building graph to determine whether a camera needs to be repositioned. For example, if the stitched video shows a user walking from camera A to camera C but camera B, which has a field of view between camera A and camera C, does not pick up the user, camera B may need to be repositioned. This repositioning can improve camera placement and/or help remove blind spots.

In some embodiments, the building system can generate a user interface (UI) for display on a display device of a user device of a user. The UI can provide an indication of the stitched video and/or allow the user to review and play the video. In some embodiments, the UI may have a search feature that allows a user to search through video clips of the various video cameras of the surveillance system.

Referring now to FIG. 1, a building data platform 100 including an edge platform 102, a cloud platform 106, and a twin manager 108 are shown, according to an exemplary embodiment. The edge platform 102, the cloud platform 106, and the twin manager 108 can each be separate services deployed on the same or different computing systems. In some embodiments, the cloud platform 106 and the twin manager 108 are implemented in off premises computing systems, e.g., outside a building. The edge platform 102 can be implemented on-premises, e.g., within the building. However, any combination of on-premises and off-premises components of the building data platform 100 can be implemented.

The building data platform 100 includes applications 110. The applications 110 can be various applications that operate to manage the building subsystems 122. The applications 110 can be remote or on-premises applications (or a hybrid of both) that run on various computing systems. The applications 110 can include an alarm application 168 configured to manage alarms for the building subsystems 122. The applications 110 include an assurance application 170 that implements assurance services for the building subsystems 122. In some embodiments, the applications 110 include an energy application 172 configured to manage the energy usage of the building subsystems 122. The applications 110 include a security application 174 configured to manage security systems of the building.

In some embodiments, the applications 110 and/or the cloud platform 106 interacts with a user device 176. In some embodiments, a component or an entire application of the applications 110 runs on the user device 176. The user device 176 may be a laptop computer, a desktop computer, a smartphone, a tablet, and/or any other device with an input interface (e.g., touch screen, mouse, keyboard, etc.) and an output interface (e.g., a speaker, a display, etc.).

The applications 110, the twin manager 108, the cloud platform 106, and the edge platform 102 can be implemented on one or more computing systems, e.g., on processors and/or memory devices. For example, the edge platform 102 includes processor(s) 118 and memories 120, the cloud platform 106 includes processor(s) 124 and memories 126, the applications 110 include processor(s) 164 and memories 166, and the twin manager 108 includes processor(s) 148 and memories 150.

The processors can be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.).

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

The edge platform 102 can be configured to provide connection to the building subsystems 122. The edge platform 102 can receive messages from the building subsystems 122 and/or deliver messages to the building subsystems 122. The edge platform 102 includes one or multiple gateways, e.g., the gateways 112-116. The gateways 112-116 can act as a gateway between the cloud platform 106 and the building subsystems 122. The gateways 112-116 can be the gateways described in U.S. Provisional Patent Application No. 62/951,897 filed Dec. 20, 2019, the entirety of which is incorporated by reference herein. In some embodiments, the applications 110 can be deployed on the edge platform 102. In this regard, lower latency in management of the building subsystems 122 can be realized.

The edge platform 102 can be connected to the cloud platform 106 via a network 104. The network 104 can communicatively couple the devices and systems of building data platform 100. In some embodiments, the network 104 is at least one of and/or a combination of a Wi-Fi network, a wired Ethernet network, a ZigBee network, a Bluetooth network, and/or any other wireless network. The network 104 may be a local area network or a wide area network (e.g., the Internet, a building WAN, etc.) and may use a variety of communications protocols (e.g., BACnet, IP, LON, etc.). The network 104 may include routers, modems, servers, cell towers, satellites, and/or network switches. The network 104 may be a combination of wired and wireless networks.

The cloud platform 106 can be configured to facilitate communication and routing of messages between the applications 110, the twin manager 108, the edge platform 102, and/or any other system. The cloud platform 106 can include a platform manager 128, a messaging manager 140, a command processor 136, and an enrichment manager 138. In some embodiments, the cloud platform 106 can facilitate messaging between the building data platform 100 via the network 104.

The messaging manager 140 can be configured to operate as a transport service that controls communication with the building subsystems 122 and/or any other system, e.g., managing commands to devices (C2D), commands to connectors (C2C) for external systems, commands from the device to the cloud (D2C), and/or notifications. The messaging manager 140 can receive different types of data from the applications 110, the twin manager 108, and/or the edge platform 102. The messaging manager 140 can receive change on value data 142, e.g., data that indicates that a value of a point has changed. The messaging manager 140 can receive timeseries data 144, e.g., a time correlated series of data entries each associated with a particular time stamp. Furthermore, the messaging manager 140 can receive command data 146. All of the messages handled by the cloud platform 106 can be handled as an event, e.g., the data 142-146 can each be packaged as an event with a data value occurring at a particular time (e.g., a temperature measurement made at a particular time).

The cloud platform 106 includes a command processor 136. The command processor 136 can be configured to receive commands to perform an action from the applications 110, the building subsystems 122, the user device 176, etc. The command processor 136 can manage the commands, determine whether the commanding system is authorized to perform the particular commands, and communicate the commands to the commanded system, e.g., the building subsystems 122 and/or the applications 110. The commands could be a command to change an operational setting that control environmental conditions of a building, a command to run analytics, etc.

The cloud platform 106 includes an enrichment manager 138. The enrichment manager 138 can be configured to enrich the events received by the messaging manager 140. The enrichment manager 138 can be configured to add contextual information to the events. The enrichment manager 138 can communicate with the twin manager 108 to retrieve the contextual information. In some embodiments, the contextual information is an indication of information related to the event. For example, if the event is a timeseries temperature measurement of a thermostat, contextual information such as the location of the thermostat (e.g., what room), the equipment controlled by the thermostat (e.g., what VAV), etc. can be added to the event. In this regard, when a consuming application, e.g., one of the applications 110 receives the event, the consuming application can operate based on the data of the event, the temperature measurement, and also the contextual information of the event.

The enrichment manager 138 can solve a problem that when a device produces a significant amount of information, the information may contain simple data without context. An example might include the data generated when a user scans a badge at a badge scanner of the building subsystems 122. This physical event can generate an output event including such information as "DeviceBadgeScannerID," "BadgeID," and/or "Date/Time." However, if a system sends this data to a consuming application, e.g., Consumer A and a Consumer B, each customer may need to call the building data platform knowledge service to query information with queries such as, "What space, build, floor is that badge scanner in?" or "What user is associated with that badge?"

By performing enrichment on the data feed, a system can be able to perform inferences on the data. A result of the enrichment may be transformation of the message "DeviceBadgeScannerId, BadgeId, Date/Time," to "Region, Building, Floor, Asset, DeviceId, BadgeId, UserName, EmployeeId, Date/Time Scanned." This can be a significant optimization, as a system can reduce the number of calls by 1/n, where n is the number of consumers of this data feed.

By using this enrichment, a system can also have the ability to filter out undesired events. If there are 100 building in a campus that receive 100,000 events per building each hour, but only 1 building is actually commissioned, only 1/100 of the events are enriched. By looking at what events are enriched and what events are not enriched, a system can do traffic shaping of forwarding of these events to reduce the cost of forwarding events that no consuming application wants or reads.

An example of an event received by the enrichment manager 138 may be:

```
{
"id": "someguid",
"eventType": "Device_Heartbeat",
"eventTime": "2018-01-27T00:00:00+00:00"
"eventValue": 1,
"deviceID": "someguid"
}
```

An example of an enriched event generated by the enrichment manager 138 may be:

```
{
"id": "someguid",
"eventType": "Device_Heartbeat",
"eventTime": "2018-01-27T00:00:00+00:00"
"eventValue": 1,
"deviceID": "someguid",
"buildingName": "Building-48",
"buildingID": "SomeGuid",
"panelID": "SomeGuid",
"panelName": "Building-48-Panel-13",
"cityID": 371,
"cityName": "Milwaukee",
"stateID": 48,
"stateName": "Wisconsin (WI)",
"countryID": 1,
"countryName": "United States"
}
```

By receiving enriched events, an application of the applications 110 can be able to populate and/or filter what events are associated with what areas. Furthermore, user interface generating applications can generate user interfaces that include the contextual information based on the enriched events.

The cloud platform 106 includes a platform manager 128. The platform manager 128 can be configured to manage the users and/or subscriptions of the cloud platform 106. For example, what subscribing building, user, and/or tenant utilizes the cloud platform 106. The platform manager 128 includes a provisioning service 130 configured to provision the cloud platform 106, the edge platform 102, and the twin manager 108. The platform manager 128 includes a subscription service 132 configured to manage a subscription of the building, user, and/or tenant while the entitlement service 134 can track entitlements of the buildings, users, and/or tenants.

The twin manager 108 can be configured to manage and maintain a digital twin. The digital twin can be a digital representation of the physical environment, e.g., a building, an apartment complex, a house, a hospital, a school, a campus, a city, a town, a boat, a shipping yard, a manufacturing environment, a private or public premises, a storage yard, a warehouse, an area of land, an interior of a building, an exterior of a building, etc. The twin manager 108 can include a change feed generator 152, a schema and ontology 154, a projection manager 156, a policy manager 158, an entity, relationship, and event database 160, and a graph projection database 162.

The graph projection manager 156 can be configured to construct graph projections and store the graph projections in the graph projection database 162. Examples of graph projections are shown in FIGS. 11-13. Entities, relationships, and events can be stored in the database 160. The graph projection manager 156 can retrieve entities, relationships, and/or events from the database 160 and construct a graph projection based on the retrieved entities, relationships and/or events. In some embodiments, the database 160 includes an entity-relationship collection for multiple subscriptions.

In some embodiment, the graph projection manager 156 generates a graph projection for a particular user, application, subscription, and/or system. In this regard, the graph projection can be generated based on policies for the particular user, application, and/or system in addition to an ontology specific for that user, application, and/or system. In this regard, an entity could request a graph projection and the graph projection manager 156 can be configured to generate the graph projection for the entity based on policies and an ontology specific to the entity. The policies can indicate what entities, relationships, and/or events the entity has access to. The ontology can indicate what types of relationships between entities the requesting entity expects to see, e.g., floors within a building, devices within a floor, etc. Another requesting entity may have an ontology to see devices within a building and applications for the devices within the graph.

The graph projections generated by the graph projection manager 156 and stored in the graph projection database 162 can be a knowledge graph and is an integration point. For example, the graph projections can represent floor plans and systems associated with each floor. Furthermore, the graph projections can include events, e.g., telemetry data of the building subsystems 122. The graph projections can show application services as nodes and API calls between the services as edges in the graph. The graph projections can illustrate the capabilities of spaces, users, and/or devices. The graph projections can include indications of the building subsystems 122, e.g., thermostats, cameras, VAVs, etc. The graph projection database 162 can store graph projections that keep up a current state of a building.

The graph projections of the graph projection database 162 can be digital twins of a building. Digital twins can be digital replicas of physical entities that enable an in-depth analysis of data of the physical entities and provide the potential to monitor systems to mitigate risks, manage issues, and utilize simulations to test future solutions. Digital twins can play an important role in helping technicians find the root cause of issues and solve problems faster, in supporting safety and security protocols, and in supporting building managers in more efficient use of energy and other facilities resources. Digital twins can be used to enable and unify security systems, employee experience, facilities management, sustainability, etc.

In some embodiments the enrichment manager 138 can use a graph projection of the graph projection database 162 to enrich events. In some embodiments, the enrichment manager 138 can identify nodes and relationships that are associated with, and are pertinent to, the device that generated the event. For example, the enrichment manager 138 could identify a thermostat generating a temperature measurement event within the graph. The enrichment manager 138 can identify relationships between the thermostat and spaces, e.g., a zone that the thermostat is located in. The enrichment manager 138 can add an indication of the zone to the event.

Furthermore, the command processor 136 can be configured to utilize the graph projections to command the building subsystems 122. The command processor 136 can identify a policy for a commanding entity within the graph projection to determine whether the commanding entity has the ability to make the command. For example, the command processor 136, before allowing a user to make a command, determine, based on the graph projection database 162, to determine that the user has a policy to be able to make the command.

In some embodiments, the policies can be conditional based policies. For example, the building data platform 100 can apply one or more conditional rules to determine whether a particular system has the ability to perform an action. In some embodiments, the rules analyze a behavioral based biometric. For example, a behavioral based biometric can indicate normal behavior and/or normal behavior rules for a system. In some embodiments, when the building data platform 100 determines, based on the one or more conditional rules, that an action requested by a system does not match a normal behavior, the building data platform 100 can deny the system the ability to perform the action and/or request approval from a higher level system.

For example, a behavior rule could indicate that a user has access to log into a system with a particular IP address between 8 A.M. through 5 P.M. However, if the user logs in to the system at 7 P.M., the building data platform 100 may contact an administrator to determine whether to give the user permission to log in.

The change feed generator 152 can be configured to generate a feed of events that indicate changes to the digital twin, e.g., to the graph. The change feed generator 152 can track changes to the entities, relationships, and/or events of the graph. For example, the change feed generator 152 can detect an addition, deletion, and/or modification of a node or edge of the graph, e.g., changing the entities, relationships, and/or events within the database 160. In response to detecting a change to the graph, the change feed generator 152 can generate an event summarizing the change. The event can indicate what nodes and/or edges have changed and how the nodes and edges have changed. The events can be posted to a topic by the change feed generator 152.

The change feed generator 152 can implement a change feed of a knowledge graph. The building data platform 100 can implement a subscription to changes in the knowledge graph. When the change feed generator 152 posts events in the change feed, subscribing systems or applications can receive the change feed event. By generating a record of all changes that have happened, a system can stage data in different ways, and then replay the data back in whatever order the system wishes. This can include running the changes sequentially one by one and/or by jumping from one major change to the next. For example, to generate a graph at a particular time, all change feed events up to the particular time can be used to construct the graph.

The change feed can track the changes in each node in the graph and the relationships related to them, in some embodiments. If a user wants to subscribe to these changes and the user has proper access, the user can simply submit a web API call to have sequential notifications of each change that happens in the graph. A user and/or system can replay the changes one by one to reinstitute the graph at any given time slice. Even though the messages are "thin" and only include notification of change and the reference "id/seq id," the change feed can keep a copy of every state of each node and/or relationship so that a user and/or system can retrieve those past states at any time for each node. Furthermore, a consumer of the change feed could also create dynamic "views" allowing different "snapshots" in time of what the graph looks like from a particular context. While the twin manager 108 may contain the history and the current state of the graph based upon schema evaluation, a consumer can retain a copy of that data, and thereby create dynamic views using the change feed.

The schema and ontology 154 can define the message schema and graph ontology of the twin manager 108. The message schema can define what format messages received by the messaging manager 140 should have, e.g., what parameters, what formats, etc. The ontology can define graph projections, e.g., the ontology that a user wishes to view. For example, various systems, applications, and/or users can be associated with a graph ontology. Accordingly, when the graph projection manager 156 generates an graph projection for a user, system, or subscription, the graph projection manager 156 can generate a graph projection according to the ontology specific to the user. For example, the ontology can define what types of entities are related in what order in a graph, for example, for the ontology for a subscription of "Customer A," the graph projection manager 156 can create relationships for a graph projection based on the rule:

Region⬅➡ Building⬅➡ Floor⬅➡ Space⬅
➡ Asset

For the ontology of a subscription of "Customer B," the graph projection manager 156 can create relationships based on the rule:

Building⬅➡ Floor⬅➡ Asset

The policy manager 158 can be configured to respond to requests from other applications and/or systems for policies. The policy manager 158 can consult a graph projection to determine what permissions different applications, users, and/or devices have. The graph projection can indicate various permissions that different types of entities have and the policy manager 158 can search the graph projection to identify the permissions of a particular entity. The policy manager 158 can facilitate fine grain access control with user permissions. The policy manager 158 can apply permissions across a graph, e.g., if "user can view all data associated with floor 1" then they see all subsystem data for that floor, e.g., surveillance cameras, HVAC devices, fire detection and response devices, etc.

The twin manager 108 includes a query manager 165 and a twin function manager 167. The query manger 164 can be configured to handle queries received from a requesting system, e.g., the user device 176, the applications 110, and/or any other system. The query manager 165 can receive queries that include query parameters and context. The query manager 165 can query the graph projection database 162 with the query parameters to retrieve a result. The query manager 165 can then cause an event processor, e.g., a twin function, to operate based on the result and the context. In some embodiments, the query manager 165 can select the twin function based on the context and/or perform operates based on the context. In some embodiments, the query manager 165 is configured to perform the operations described with reference to FIGS. 5-10.

The twin function manager 167 can be configured to manage the execution of twin functions. The twin function manager 167 can receive an indication of a context query that identifies a particular data element and/or pattern in the graph projection database 162. Responsive to the particular data element and/or pattern occurring in the graph projection database 162 (e.g., based on a new data event added to the graph projection database 162 and/or change to nodes or edges of the graph projection database 162, the twin function manager 167 can cause a particular twin function to execute. The twin function can execute based on an event, context, and/or rules. The event can be data that the twin function executes against. The context can be information that provides a contextual description of the data, e.g., what device the event is associated with, what control point should be updated based on the event, etc. The twin function manager 167 can be configured to perform the operations of the FIGS. 11-15.

Figure 2:
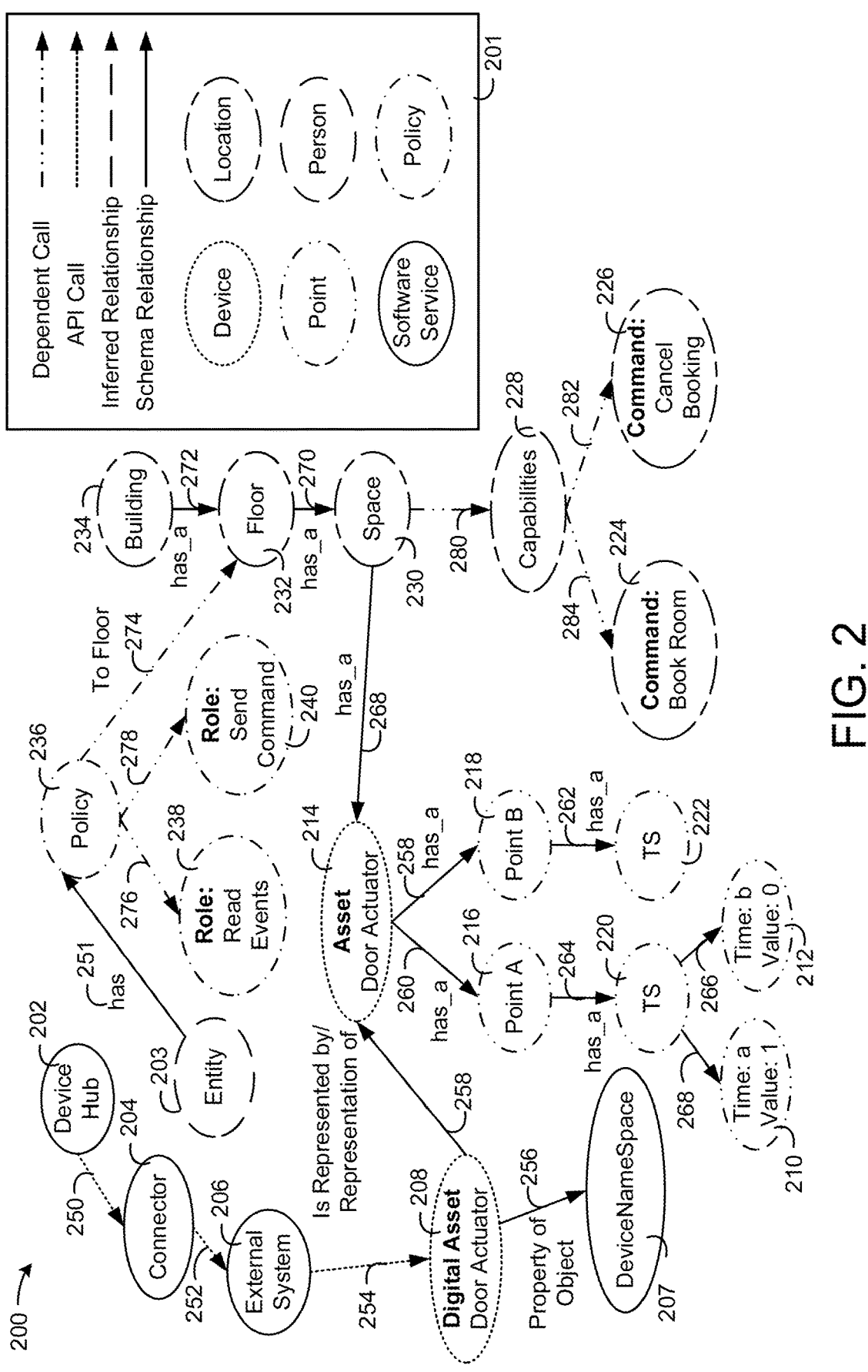
FIG. 2 is a graph projection of the twin manager of FIG. 1 including application programming interface (API) data, capability data, policy data, and services, according to an exemplary embodiment.

Referring now to FIG. 2, a graph projection 200 of the twin manager 108 including application programming interface (API) data, capability data, policy data, and services is shown, according to an exemplary embodiment. The graph projection 200 includes nodes 202-240 and edges 250-272. The nodes 202-240 and the edges 250-272 are defined according to the key 201. The nodes 202-240 represent different types of entities, devices, locations, points, persons, policies, and software services (e.g., API services). The edges 250-272 represent relationships between the nodes 202-240, e.g., dependent calls, API calls, inferred relationships, and schema relationships (e.g., BRICK relationships).

The graph projection 200 includes a device hub 202 which may represent a software service that facilitates the communication of data and commands between the cloud platform 106 and a device of the building subsystems 122, e.g., door actuator 214. The device hub 202 is related to a connector 204, an external system 206, and a digital asset "Door Actuator" 208 by edge 250, edge 252, and edge 254.

The cloud platform 106 can be configured to identify the device hub 202, the connector 204, the external system 206 related to the door actuator 214 by searching the graph projection 200 and identifying the edges 250-254 and edge 258. The graph projection 200 includes a digital representation of the "Door Actuator," node 208. The digital asset "Door Actuator" 208 includes a "DeviceNameSpace" represented by node 207 and related to the digital asset "Door Actuator" 208 by the "Property of Object" edge 256.

The "Door Actuator" 214 has points and timeseries. The "Door Actuator" 214 is related to "Point A" 216 by a "has_a" edge 260. The "Door Actuator" 214 is related to "Point B" 218 by a "has_A" edge 258. Furthermore, timeseries associated with the points A and B are represented by nodes "TS" 220 and "TS" 222. The timeseries are related to the points A and B by "has_a" edge 264 and "has_a" edge 262. The timeseries "TS" 220 has particular samples, sample 210 and 212 each related to "TS" 220 with edges 268 and 266 respectively. Each sample includes a time and a value. Each sample may be an event received from the door actuator that the cloud platform 106 ingests into the entity, relationship, and event database 160, e.g., ingests into the graph projection 200.

The graph projection 200 includes a building 234 representing a physical building. The building includes a floor represented by floor 232 related to the building 234 by the "has_a" edge from the building 234 to the floor 232. The floor has a space indicated by the edge "has_a" 270 between the floor 232 and the space 230. The space has particular capabilities, e.g., is a room that can be booked for a meeting, conference, private study time, etc. Furthermore, the booking can be canceled. The capabilities for the floor 232 are represented by capabilities 228 related to space 230 by edge 280. The capabilities 228 are related to two different commands, command "book room" 224 and command "cancel booking" 226 related to capabilities 228 by edge 284 and edge 282 respectively.

If the cloud platform 106 receives a command to book the space represented by the node, space 230, the cloud platform 106 can search the graph projection 200 for the capabilities for the 228 related to the space 230 to determine whether the cloud platform 106 can book the room.

In some embodiments, the cloud platform 106 could receive a request to book a room in a particular building, e.g., the building 234. The cloud platform 106 could search the graph projection 200 to identify spaces that have the capabilities to be booked, e.g., identify the space 230 based on the capabilities 228 related to the space 230. The cloud platform 106 can reply to the request with an indication of the space and allow the requesting entity to book the space 230.

The graph projection 200 includes a policy 236 for the floor 232. The policy 236 is related set for the floor 232 based on a "To Floor" edge 274 between the policy 236 and the floor 232. The policy 236 is related to different roles for the floor 232, read events 238 via edge 276 and send command 240 via edge 278. The policy 236 is set for the entity 203 based on has edge 251 between the entity 203 and the policy 236.

The twin manager 108 can identify policies for particular entities, e.g., users, software applications, systems, devices, etc. based on the policy 236. For example, if the cloud platform 106 receives a command to book the space 230. The cloud platform 106 can communicate with the twin manager 108 to verify that the entity requesting to book the space 230 has a policy to book the space. The twin manager 108 can identify the entity requesting to book the space as the entity 203 by searching the graph projection 200. Furthermore, the twin manager 108 can further identify the edge has 251 between the entity 203 and the policy 236 and the edge 1178 between the policy 236 and the command 240.

Furthermore, the twin manager 108 can identify that the entity 203 has the ability to command the space 230 based on the edge 1174 between the policy 236 and the edge 270 between the floor 232 and the space 230. In response to identifying the entity 203 has the ability to book the space 230, the twin manager 108 can provide an indication to the cloud platform 106.

Furthermore, if the entity makes a request to read events for the space 230, e.g., the sample 210 and the sample 212, the twin manager 108 can identify the edge has 251 between the entity 203 and the policy 236, the edge 1178 between the policy 236 and the read events 238, the edge 1174 between the policy 236 and the floor 232, the "has_a" edge 270 between the floor 232 and the space 230, the edge 268 between the space 230 and the door actuator 214, the edge 260 between the door actuator 214 and the point A 216, the "has_a" edge 264 between the point A 216 and the TS 220, and the edges 268 and 266 between the TS 220 and the samples 210 and 212 respectively.

Figure 3:
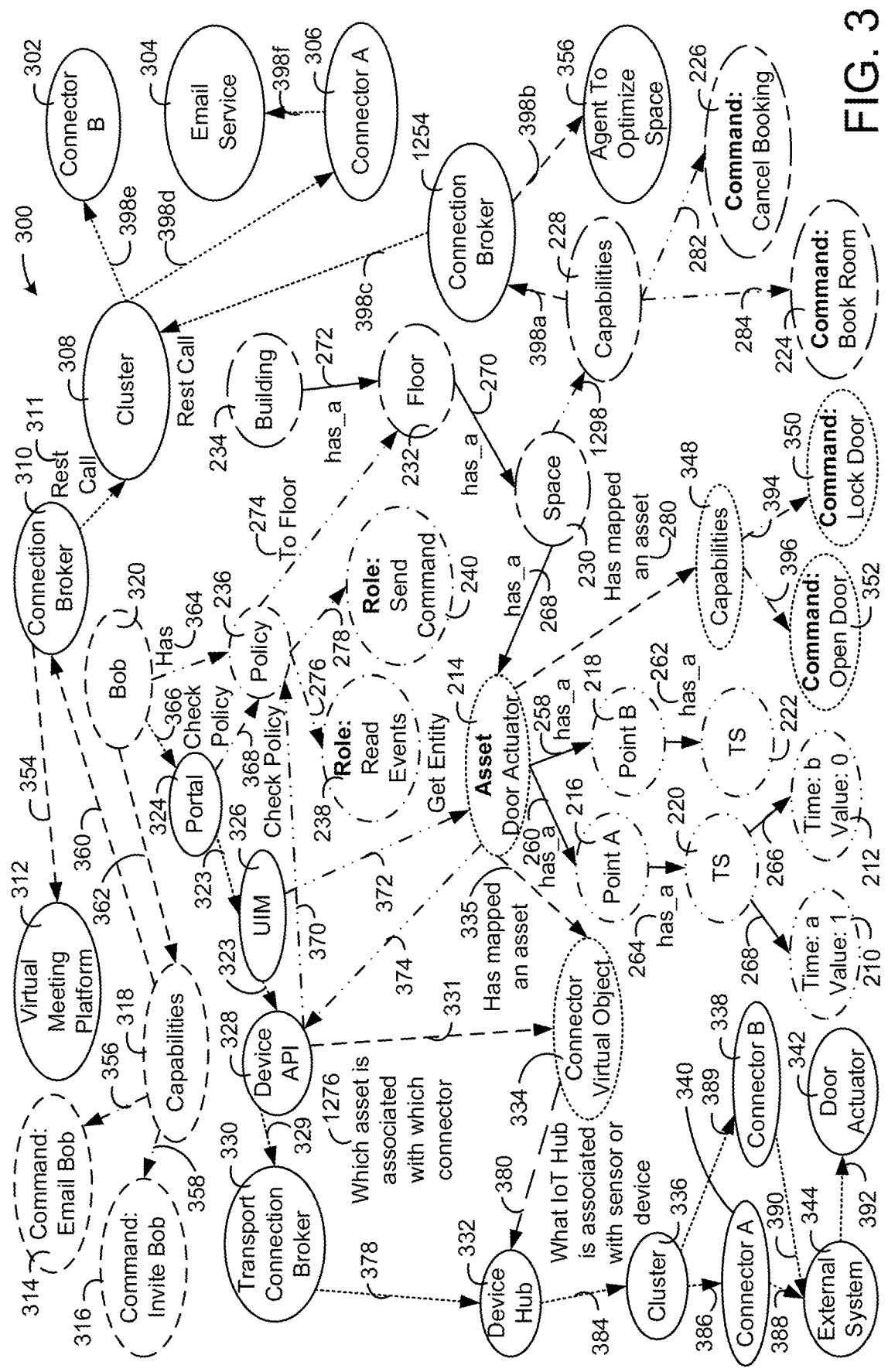
FIG. 3 is another graph projection of the twin manager of FIG. 1 including application programming interface (API) data, capability data, policy data, and services, according to an exemplary embodiment.

Referring now to FIG. 3, a graph projection 300 of the twin manager 108 including application programming interface (API) data, capability data, policy data, and services is shown, according to an exemplary embodiment. The graph projection 300 includes the nodes and edges described in the graph projection 200 of FIG. 2. The graph projection 300 includes a connection broker 354 related to capabilities 228 by edge 398a. The connection broker 354 can be a node representing a software application configured to facilitate a connection with another software application. In some embodiments, the cloud platform 106 can identify the system that implements the capabilities 228 by identifying the edge 398a between the capabilities 228 and the connection broker 354.

The connection broker 354 is related to an agent that optimizes a space 356 via edge 398b. The agent represented by the node 356 can book and cancel bookings for the space represented by the node 230 based on the edge 398b between the connection broker 354 and the node 356 and the edge 398a between the capabilities 228 and the connection broker 354.

The connection broker 354 is related to a cluster 308 by edge 398c. Cluster 308 is related to connector B 302 via edge 398e and connector A 306 via edge 398d. The connector A 306 is related to an external subscription service 304. A connection broker 310 is related to cluster 308 via an edge 311 representing a rest call that the connection broker represented by node 310 can make to the cluster represented by cluster 308.

The connection broker 310 is related to a virtual meeting platform 312 by an edge 354. The node 312 represents an external system that represents a virtual meeting platform. The connection broker represented by node 310 can represent a software component that facilitates a connection between the cloud platform 106 and the virtual meeting platform represented by node 312. When the cloud platform 106 needs to communicate with the virtual meeting platform represented by the node 312, the cloud platform 106 can identify the edge 354 between the connection broker 310 and the virtual meeting platform 312 and select the connection broker represented by the node 310 to facilitate communication with the virtual meeting platform represented by the node 312.

A capabilities node 318 can be connected to the connection broker 310 via edge 360. The capabilities 318 can be capabilities of the virtual meeting platform represented by the node 312 and can be related to the node 312 through the edge 360 to the connection broker 310 and the edge 354 between the connection broker 310 and the node 312. The capabilities 318 can define capabilities of the virtual meeting platform represented by the node 312. The node 320 is related to capabilities 318 via edge 362. The capabilities may be an invite bob command represented by node 316 and an email bob command represented by node 314. The capabilities 318 can be linked to a node 320 representing a user, Bob. The cloud platform 106 can facilitate email commands to send emails to the user Bob via the email service represented by the node 304. The node 304 is related to the connect a node 306 via edge 398f. Furthermore, the cloud platform 106 can facilitate sending an invite for a virtual meeting via the virtual meeting platform represented by the node 312 linked to the node 318 via the edge 358.

The node 320 for the user Bob can be associated with the policy 236 via the "has" edge 364. Furthermore, the node 320 can have a "check policy" edge 366 with a portal node 324. The device API node 328 has a check policy edge 370 to the policy node 236. The portal node 324 has an edge 368 to the policy node 236. The portal node 324 has an edge 323 to a node 326 representing a user input manager (UIM). The portal node 324 is related to the UIM node 326 via an edge 323. The UIM node 326 has an edge 323 to a device API node 328. The UIM node 326 is related to the door actuator node 214 via edge 372. The door actuator node 214 has an edge 374 to the device API node 328. The door actuator 214 has an edge 335 to the connector virtual object 334. The device hub 332 is related to the connector virtual object via edge 380. The device API node 328 can be an API for the door actuator 214. The connector virtual object 334 is related to the device API node 328 via the edge 331.

The device API node 328 is related to a transport connection broker 330 via an edge 329. The transport connection broker 330 is related to a device hub 332 via an edge 378. The device hub represented by node 332 can be a software component that hands the communication of data and commands for the door actuator 214. The cloud platform 106 can identify where to store data within the graph projection 300 received from the door actuator by identifying the nodes and edges between the points 216 and 218 and the device hub node 332. Similarly, the cloud platform 106 can identify commands for the door actuator that can be facilitated by the device hub represented by the node 332, e.g., by identifying edges between the device hub node 332 and an open door node 352 and an lock door node 350. The door actuator 114 has an edge "has mapped an asset" 280 between the node 214 and a capabilities node 348. The capabilities node 348 and the nodes 352 and 350 are linked by edges 396 and 394.

The device hub 332 is linked to a cluster 336 via an edge 384. The cluster 336 is linked to connector A 340 and connector B 338 by edges 386 and the edge 389. The connector A 340 and the connector B 338 is linked to an external system 344 via edges 388 and 390. The external system 344 is linked to a door actuator 342 via an edge 392.

Figure 4:
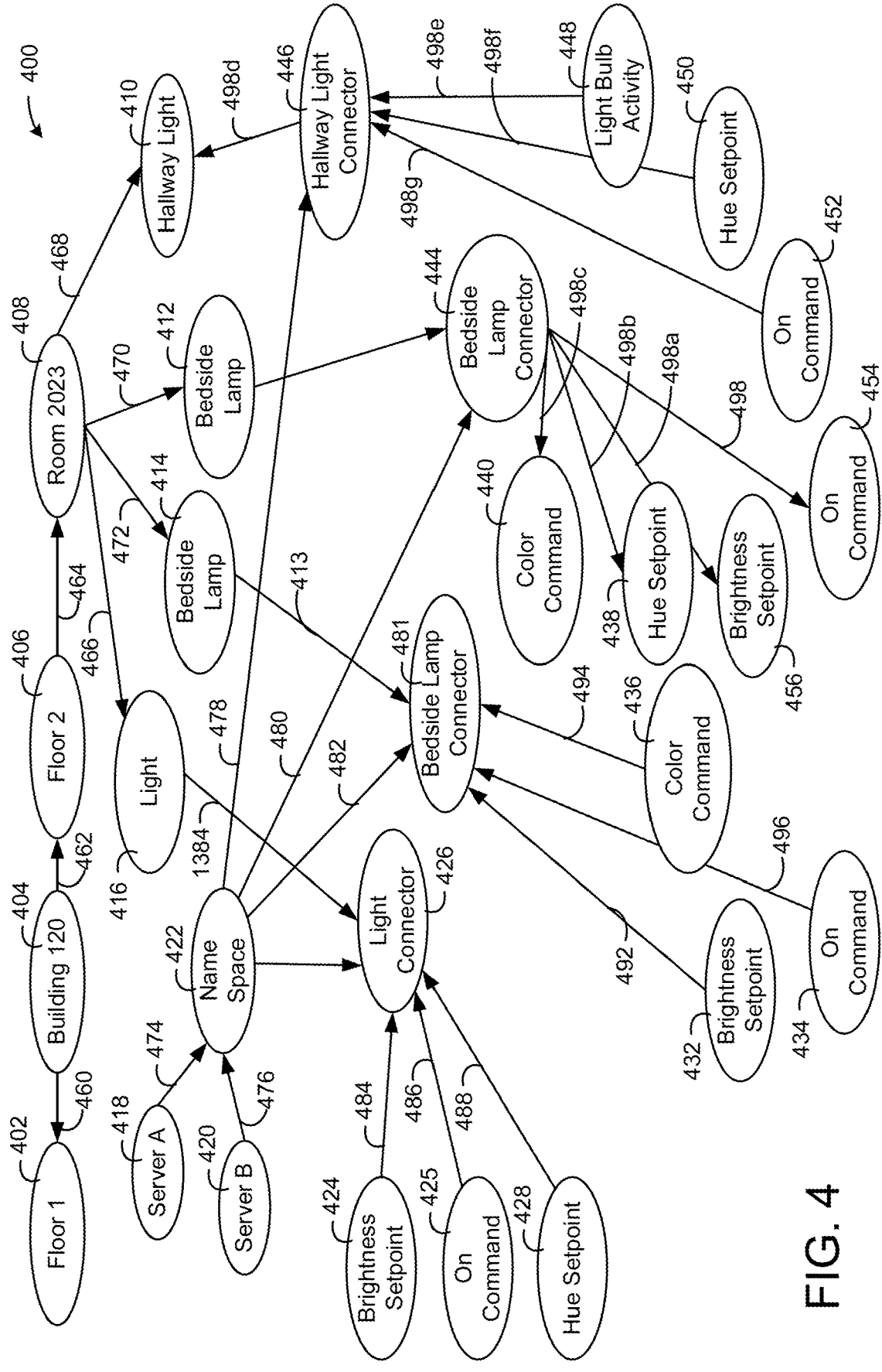
FIG. 4 is a graph projection of the twin manager of FIG. 1 including equipment and capability data for the equipment, according to an exemplary embodiment.

Referring now to FIG. 4, a graph projection 400 of the twin manager 108 including equipment and capability data for the equipment is shown, according to an exemplary embodiment. The graph projection 400 includes nodes 402-456 and edges 360-498f. The cloud platform 106 can search the graph projection 400 to identify capabilities of different pieces of equipment.

A building node 404 represents a particular building that includes two floors. A floor 1 node 402 is linked to the building node 404 via edge 460 while a floor 2 node 406 is linked to the building node 404 via edge 462. The floor 2 includes a particular room 2023 represented by edge 464 between floor 2 node 406 and room 2023 node 408. Various pieces of equipment are included within the room 2023. A light represented by light node 416, a bedside lamp node 414, a bedside lamp node 412, and a hallway light node 410 are related to room 2023 node 408 via edge 466, edge 472, edge 470, and edge 468.

The light represented by light node 416 is related to a light connector 426 via edge 484. The light connector 426 is related to multiple commands for the light represented by the light node 416 via edges 484, 486, and 488. The commands may be a brightness setpoint 424, an on command 425, and a hue setpoint 428. The cloud platform 106 can receive a request to identify commands for the light represented by the light 416 and can identify the nodes 424-428 and provide an indication of the commands represented by the node 424-428 to the requesting entity. The requesting entity can then send commands for the commands represented by the nodes 424-428.

The bedside lamp node 414 is linked to a bedside lamp connector 481 via an edge 413. The connector 481 is related to commands for the bedside lamp represented by the bedside lamp node 414 via edges 492, 496, and 494. The command nodes are a brightness setpoint node 432, an on command node 434, and a color command 436. The hallway light 410 is related to a hallway light connector 446 via an edge 498d. The hallway light connector 446 is linked to multiple commands for the hallway light node 410 via edges

498g, 498f, and 498e. The commands are represented by an on command node 452, a hue setpoint node 450, and a light bulb activity node 448.

The graph projection 400 includes a name space node 422 related to a server A node 418 and a server B node 420 via edges 474 and 476. The name space node 422 is related to the bedside lamp connector 481, the bedside lamp connector 444, and the hallway light connector 446 via edges 482, 480, and 478. The bedside lamp connector 444 is related to commands, e.g., the color command node 440, the hue setpoint command 438, a brightness setpoint command 456, and an on command 454 via edges 498c, 498b, 498a, and 498.

Figure 5:
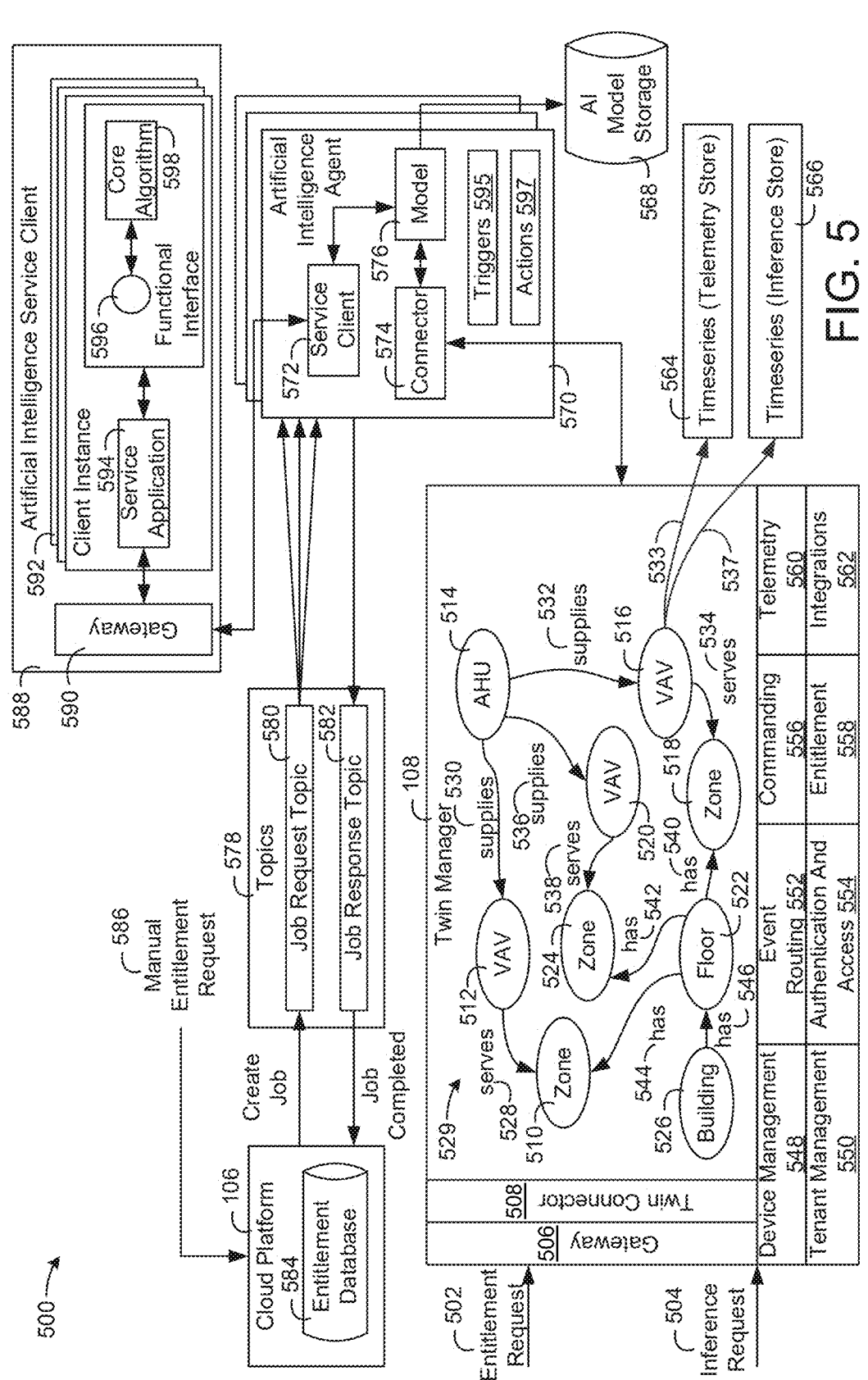
FIG. 5 is a block diagram of a system for managing a digital twin where an artificial intelligence agent can be executed to infer information for an entity of a graph, according to an exemplary embodiment.

Referring now to FIG. 5, a system 500 for managing a digital twin where an artificial intelligence agent can be executed to infer and/or predict information for an entity of a graph is shown, according to an exemplary embodiment. The system 500 can be components of the building data platform 100, e.g., components run on the processors and memories of the edge platform 102, the cloud platform 106, the twin manager 108, and/or the applications 110. The system 500 can, in some implementations, implement a digital twin with artificial intelligence.

A digital twin (or a shadow) may be a computing entity that describes a physical thing (e.g., a building, spaces of a building, devices of a building, people of the building, equipment of the building, etc.) through modeling the physical thing through a set of attributes that define the physical thing. A digital twin can refer to a digital replica of physical assets (a physical device twin) and can be extended to store processes, people, places, systems that can be used for various purposes. The digital twin can include both the ingestion of information and actions learned and executed through artificial intelligence agents.

In FIG. 5, the digital twin can be a graph 529 managed by the twin manager 108 and/or artificial intelligence agents 570. In some embodiments, the digital twin is the combination of the graph 529 with the artificial intelligence agents 570. In some embodiments, the digital twin enables the creation of a chronological time-series database of telemetry events for analytical purposes. In some embodiments, the graph 529 uses the BRICK schema.

The twin manager 108 stores the graph 529 which may be a graph data structure including various nodes and edges interrelating the nodes. The graph 529 may be the same as, or similar to, the graph projections described herein with reference to FIGS. 1-4. The graph 529 includes nodes 510-526 and edges 528-546. The graph 529 includes a building node 526 representing a building that has a floor indicated by the "has" edge 546 to the floor node 522. The floor node 522 is relate to a zone node 510 via a "has" edge 544 indicating that the floor represented by the node 522 has a zone represented by the zone 510.

The floor node 522 is related to the zone node 518 by the "has" edge 540 indicating that the floor represented by the floor node 522 has another zone represented by the zone node 518. The floor node 522 is related to another zone node 524 via a "has" edge 542 representing that the floor represented by the floor node 522 has a third zone represented by the zone node 524.

The graph 529 includes an AHU node 514 representing an AHU of the building represented by the building node 526. The AHU node 514 is related by a "supplies" edge 530 to the VAV node 512 to represent that the AHU represented by the AHU node 514 supplies air to the VAV represented by the VAV node 512. The AHU node 514 is related by a "supplies" edge 536 to the VAV node 520 to represent that the AHU represented by the AHU node 514 supplies air to the VAV represented by the VAV node 520. The AHU node 514 is related by a "supplies" edge 532 to the VAV node 516 to represent that the AHU represented by the AHU node 514 supplies air to the VAV represented by the VAV node 516.

The VAV node 516 is related to the zone node 518 via the "serves" edge 534 to represent that the VAV represented by the VAV node 516 serves (e.g., heats or cools) the zone represented by the zone node 518. The VAV node 520 is related to the zone node 524 via the "serves" edge 538 to represent that the VAV represented by the VAV node 520 serves (e.g., heats or cools) the zone represented by the zone node 524. The VAV node 512 is related to the zone node 510 via the "serves" edge 528 to represent that the VAV represented by the VAV node 512 serves (e.g., heats or cools) the zone represented by the zone node 510.

Furthermore, the graph 529 includes an edge 533 related to a timeseries node 564. The timeseries node 564 can be information stored within the graph 529 and/or can be information stored outside the graph 529 in a different database (e.g., a timeseries database). In some embodiments, the timeseries node 564 stores timeseries data (or any other type of data) for a data point of the VAV represented by the VAV node 516. The data of the timeseries node 564 can be aggregated and/or collected telemetry data of the timeseries node 564.

Furthermore, the graph 529 includes an edge 537 related to a timeseries node 566. The timeseries node 566 can be information stored within the graph 529 and/or can be information stored outside the graph 529 in a different database (e.g., a timeseries database). In some embodiments, the timeseries node 566 stores timeseries data (or any other type of data) for a data point of the VAV represented by the VAV node 516. The data of the timeseries node 564 can be inferred information, e.g., data inferred by one of the artificial intelligence agents 570 and written into the timeseries node 564 by the artificial intelligence agent 570. In some embodiments, the timeseries 564 and/or 566 are stored in the graph 529 but are stored as references to timeseries data stored in a timeseries database.

The twin manager 108 includes various software components. For example, the twin manager 108 includes a device management component 548 for managing devices of a building. The twin manager 108 includes a tenant management component 550 for managing various tenant subscriptions. The twin manager 108 includes an event routing component 552 for routing various events. The twin manager 108 includes an authentication and access component 554 for performing user and/or system authentication and grating the user and/or system access to various spaces, pieces of software, devices, etc. The twin manager 108 includes a commanding component 556 allowing a software application and/or user to send commands to physical devices. The twin manager 108 includes an entitlement component 558 that analyzes the entitlements of a user and/or system and grants the user and/or system abilities based on the entitlements. The twin manager 108 includes a telemetry component 560 that can receive telemetry data from physical systems and/or devices and ingest the telemetry data into the graph 529. Furthermore, the twin manager 108 includes an integrations component 562 allowing the twin manager 108 to integrate with other applications.

The twin manager 108 includes a gateway 506 and a twin connector 508. The gateway 506 can be configured to integrate with other systems and the twin connector 508 can be configured to allow the gateway 506 to integrate with the twin manager 108. The gateway 506 and/or the twin connector 508 can receive an entitlement request 502 and/or an inference request 504. The entitlement request 502 can be a request received from a system and/or a user requesting that an AI agent action be taken by the AI agent 570. The entitlement request 502 can be checked against entitlements for the system and/or user to verify that the action requested by the system and/or user is allowed for the user and/or system. The inference request 504 can be a request that the AI agent 570 generates an inference, e.g., a projection of information, a prediction of a future data measurement, an extrapolated data value, etc.

The cloud platform 106 is shown to receive a manual entitlement request 586. The request 586 can be received from a system, application, and/or user device (e.g., from the applications 110, the building subsystems 122, and/or the user device 176). The manual entitlement request 586 may be a request for the AI agent 570 to perform an action, e.g., an action that the requesting system and/or user has an entitlement for. The cloud platform 106 can receive the manual entitlement request 586 and check the manual entitlement request 586 against an entitlement database 584 storing a set of entitlements to verify that the requesting system has access to the user and/or system. The cloud platform 106, responsive to the manual entitlement request 586 being approved, can create a job for the AI agent 570 to perform. The created job can be added to a job request topic 580 of a set of topics 578.

The job request topic 580 can be fed to AI agents 570. For example, the topics 580 can be fanned out to various AI agents 570 based on the AI agent that each of the topics 580 pertains to (e.g., based on an identifier that identifies an agent and is included in each job of the topic 580). The AI agents 570 include a service client 572, a connector 574, and a model 576. The model 576 can be loaded into the AI agent 570 from a set of AI models stored in the AI model storage 568. The AI model storage 568 can store models for making energy load predictions for a building, weather forecasting models for predicting a weather forecast, action/decision models to take certain actions responsive to certain conditions being met, an occupancy model for predicting occupancy of a space and/or a building, etc. The models of the AI model storage 568 can be neural networks (e.g., convolutional neural networks, recurrent neural networks, deep learning networks, etc.), decision trees, support vector machines, and/or any other type of artificial intelligence, machine learning, and/or deep learning category. In some embodiments, the models are rule based triggers and actions that include various parameters for setting a condition and defining an action.

The AI agent 570 can include triggers 595 and actions 597. The triggers 595 can be conditional rules that, when met, cause one or more of the actions 597. The triggers 595 can be executed based on information stored in the graph 529 and/or data received from the building subsystems 122. The actions 597 can be executed to determine commands, actions, and/or outputs. The output of the actions 597 can be stored in the graph 529 and/or communicated to the building subsystems 122.

The AI agent 570 can include a service client 572 that causes an instance of an AI agent to run. The instance can be hosted by the artificial intelligence service client 588. The client 588 can cause a client instance 592 to run and communicate with the AI agent 570 via a gateway 590. The client instance 592 can include a service application 594 that interfaces with a core algorithm 598 via a functional interface 596. The core algorithm 598 can run the model 576, e.g., train the model 576 and/or use the model 576 to make inferences and/or predictions.

In some embodiments, the core algorithm 598 can be configured to perform learning based on the graph 529. In some embodiments, the core algorithm 598 can read and/or analyze the nodes and relationships of the graph 529 to make decisions. In some embodiments, the core algorithm 598 can be configured to use telemetry data (e.g., the timeseries data 564) from the graph 529 to make inferences on and/or perform model learning. In some embodiments, the result of the inferences can be the timeseries 566. In some embodiments, the timeseries 564 is an input into the model 576 that predicts the timeseries 566.

In some embodiments, the core algorithm 598 can generate the timeseries 566 as an inference for a data point, e.g., a prediction of values for the data point at future times. The timeseries 564 may be actual data for the data point. In this regard, the core algorithm 598 can learn and train by comparing the inferred data values against the true data values. In this regard, the model 576 can be trained by the core algorithm 598 to improve the inferences made by the model 576.

Figure 6:
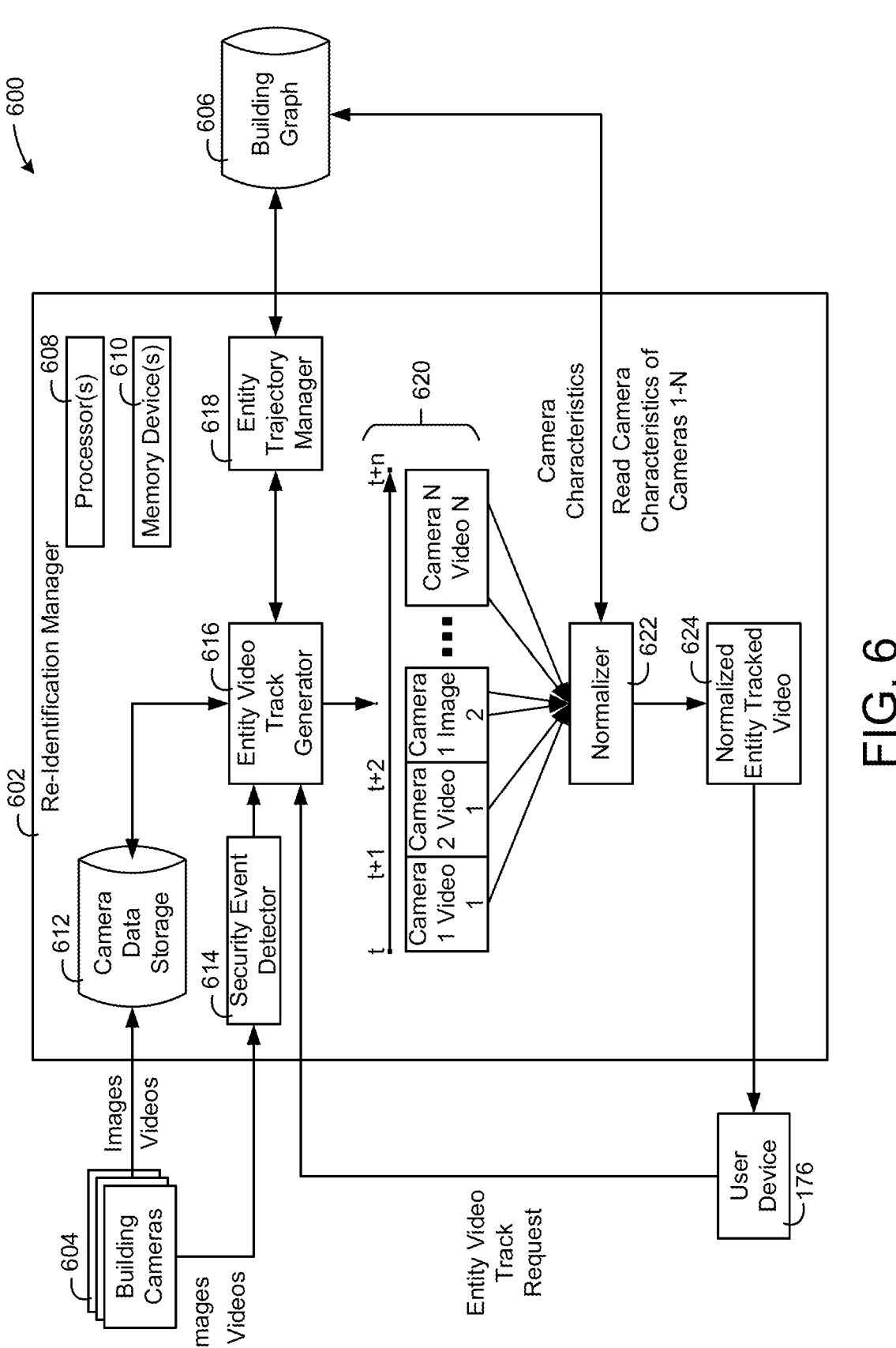
FIG. 6 is a block diagram of a re-identification manager that creates a video tracking an entity through a building based on a building graph, according to an exemplary embodiment.

Referring now to FIG. 6, a system 600 including a re-identification manager 602 creating a video 624 tracking an entity through a building based on a building graph is shown, according to an exemplary embodiment. The system 600 can be part of, integrated with, or in communication with, the building data platform 100. For example, components of the system 600 could be included within the applications 110, the cloud platform 106, the twin manager 108, and/or the edge platform 102 (e.g., implemented locally within a building).

The system 600 includes a re-identification manager 602. The manager 602 can include processor(s) 608 and memory device(s) 610. The processors 608 can be general purpose or specific purpose processors, an application specific integrated circuit (ASIC), one or more field programmable gate arrays (FPGAs), a group of processing components, or other suitable processing components. The processors 608 may be configured to execute computer code and/or instructions stored in the memory device(s) 610 or received from other computer readable media (e.g., CDROM, network storage, a remote server, etc.).

The memory devices 610 can include one or more devices (e.g., memory units, memory devices, storage devices, etc.) for storing data and/or computer code for completing and/or facilitating the various processes described in the present disclosure. The memory devices 610 can include random access memory (RAM), read-only memory (ROM), hard drive storage, temporary storage, non-volatile memory, flash memory, optical memory, or any other suitable memory for storing software objects and/or computer instructions. The memory devices 610 can include database components, object code components, script components, or any other type of information structure for supporting the various activities and information structures described in the present disclosure. The memory devices 610 can be communicably connected to the processors 608 and can include computer code for executing (e.g., by the processors) one or more processes described herein.

The manager 602 can receive data from building cameras 604, the data may be images and/or videos of various areas of a campus, parking lot, and/or building. The manager 602 can store the camera data in a camera data storage 612. The storage 612 can be a database of images and/or videos tagged based on camera number, location, entity detected within the data, etc. The images and/or videos of the building cameras 604 can be provided to a security event detector 614 of the manager 602. While the re-identification manager 602 is described with reference to analyzing video or image data of a building, the techniques described herein can be applied to any type of environment including spaces or areas, such as a building, an apartment complex, a house, a hospital, a school, a campus, a city, a town, a boat, a shipping yard, a manufacturing environment, a private or public premises, a storage yard, a warehouse, an area of land, an interior of a building, an exterior of a building, etc. A zone, space, or area can define a location defined by a boundary that a camera captures videos or images of.

The entity video track generator 616 can search the camera data storage 612 to identify images or videos that capture the entity that moves through the building. The entity video track generator 616 can search images or videos by retrieving a video or image from the camera data storage 612, performing image processing on the retrieved video or image to determine if the video or image includes the entity, and adding the video or image to the video 620 responsive to determining that the video or image captures the entity. The order in which the entity video track generator 616 retrieves and analyzes images or videos can be based on the building graph 606. For example, if the relationships between cameras and spaces indicated by the building graph 606 indicate that the entity was detected in a first space by a first camera and that the first space is connected to or leads to a second space which includes a second camera, the entity video track generator 616 can retrieve images or videos of the second camera from the camera data storage 612 and analyze the second images or videos of the second camera to determine if the second images or videos include the entity. Responsive to determining that the second images or videos include the entity, the entity video track generator 616 can add the second images or videos to the video 620. By using the building graph 606 to guide the searching of the camera data storage 612, less processing resources and less memory resources can be consumed in generating the video 620 compared to a system that may search the camera data storage 612 without any guidance. Furthermore, the re-identification manager 602 can generate the video 620 significantly faster that a system that may search the camera data storage 612 without any guidance.

The security event detector 614 can analyze the images and/or videos to determine if a security event has occurred that should cause a video track of an entity to be generated. For example, if an illegitimate person enters a premise or access certain parts of the facility, the manager 602 can start generating the video track. As another example, if a person is detected shoplifting in one or more locations within a shop, the manager 602 can start generating the video track of the shoplifter. As another example, if a car crosses one or more gates of a factory without valid permission, a vehicle video track can be generated. Because the events may happen in real-time, the manager 602 can quickly identify the events and generate a video track. The tracked video, e.g., the normalized entity tracked video 624, can help provide information such as locations the illegitimate person accessed, what items the shoplifter stole, what was the license plate of the car, who was inside the car, etc. In some embodiments, the re-identification processes performed by the manager 602 are performed in real-time as the camera data is received. In some embodiments, the re-identification processes performed by the manager 602 are performed after all of the camera data is received, stored, or collected.

The manager 602 includes an entity video track generator 616. The generator 616 can be configured to generate a video 620 that is made up of multiple videos and/or images of multiple different cameras of the building cameras 604. The generator 616 can query and retrieve images and/or videos from the storage 612 for generating the video 620. The generator 616 can query the entity trajectory manager 618 to identify the videos and/or images for the video 620. The manager entity trajectory manager 628 can determine which videos and/or images should be used to form the video 620 based on the building graph 606. The building graph 606 can be a graph of multiple nodes and/or edges, e.g., the building graph 606 shown in FIG. 9. The building graph 606 can be the same as or similar to the building graphs described with reference to FIGS. 1-5.

The entity trajectory manager 618 can generate a trajectory of an entity through a building. The trajectory of the entity can be used, along with the building graph 606, to identify cameras to retrieve camera data from. For example, if the trajectory of the entity indicates that the entity is moving from a first space to a second space, the manager 618 can determine, based on the building graph 606, that a first camera video of a first camera of the first space and a second camera video of a second camera of the second space should be spliced together in that order.

The resulting video 620 can include multiple video clips and/or images spliced together in order to track a user from a beginning point to an ending point. For example, the video 620 can include a video 1 of a camera 1, a video 1 of a camera 2, an image 2 of camera 1, etc. These videos can be stitched together by the generator 616 in an order which tracks the user. The video 620 can be provided to a camera video normalizer 622.

The normalizer 622 can be configured to normalize the video 620 to generate a normalized entity tracked video 624. The normalizer 622 can be configured to retrieve camera characteristics from the building graph 606 indicating the characteristics of the cameras. The characteristics can indicate resolution, field of view, frames per second, brightness, etc. The normalizer 622 can normalize the video 620 to normalize the various characteristics of the various cameras such that the video 624 has a common resolution, field of view, brightness, frames per second, etc. The resulting normalized entity tracked video 624 can be provided to the user device 176 for to be viewed by a user via a display device of the user device 176.

Figure 7:
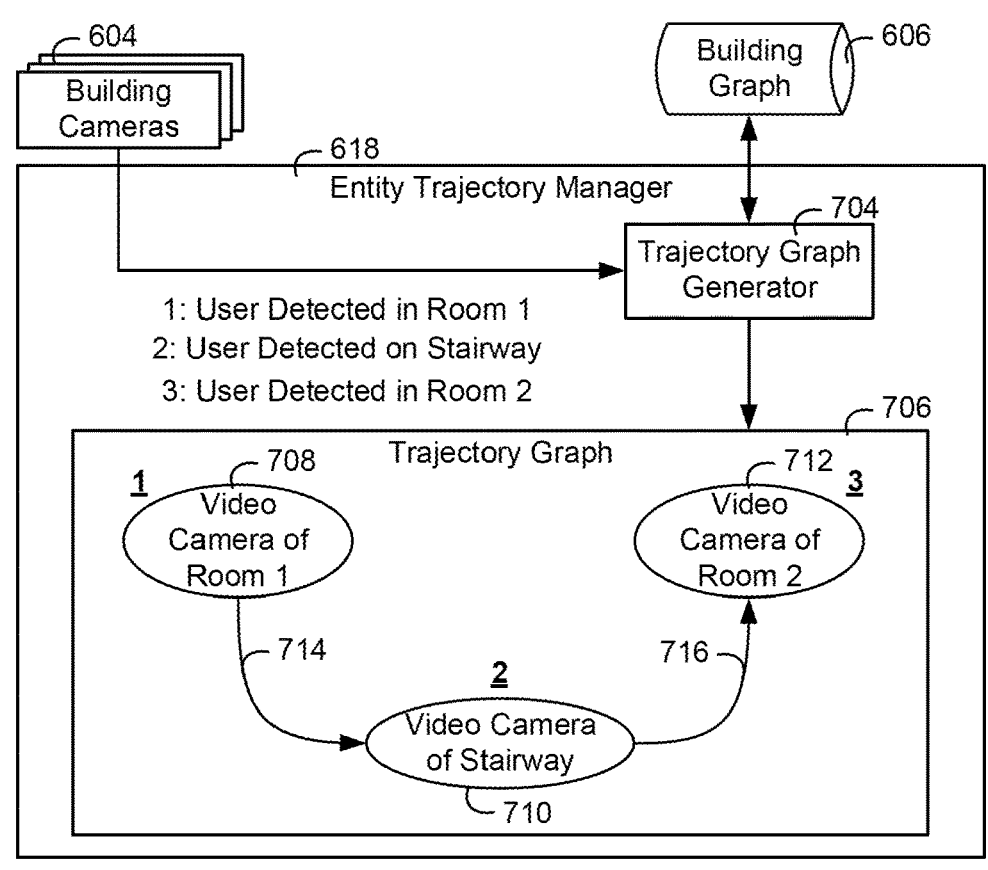
FIG. 7 is a block diagram of an entity trajectory manager of the re-identification manager of FIG. 6 generating a trajectory graph tracking the movement of a user throughout a building, according to an exemplary embodiment.
Figure 8:
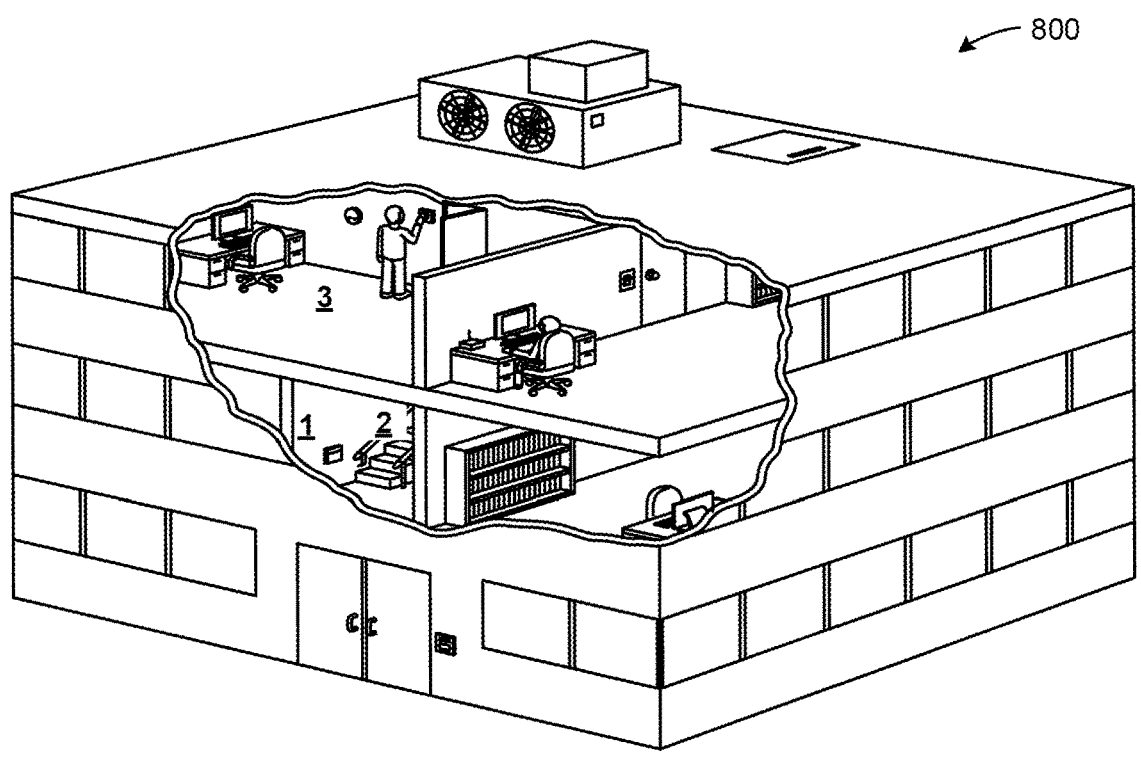
FIG. 8 is a schematic diagram of the building illustrating the movement of the user throughout the building of FIG. 7, according to an exemplary embodiment.

Referring now to FIG. 7, an entity trajectory manager 618 of the re-identification manager 602 generating a trajectory graph 706 tracking the movement of a user throughout a building is shown, according to an exemplary embodiment. The manager 618 can receive camera images and/or videos from the building cameras 604. The manager 618 includes a trajectory graph generator 704. The received data of the building cameras 604 can be received by the generator 704 and used to generate a trajectory graph 706.

The generator 704 can generate the trajectory graph 706 as detections of an entity are made in the images and/or videos of the building cameras 604 by the trajectory graph generator 704. The trajectory graph generator 704 can be configured to perform one or more region of interest (ROI) analysis processes, facial recognition processes, gait analysis processes, and/or any algorithm that can identify an entity (either known or unknown) through multiple videos and/or images. The generator 704 can utilize one or more neural networks, e.g., deep neural networks, recurrent neural networks, convolutional neural networks, etc. to perform the identification. Examples of classification and/or identification of entities with neural networks can be found in U.S.

patent application Ser. No. 16/125,994 filed Sep. 10, 2018 (issued as U.S. Pat. No. 10,713,541).

A person or an object may take a dynamic path in a premise and the manager 618 can construct the trajectory graph 706 to represent the path. The trajectory graph 706 can be used to decide the order in which video clips need to be joined. The trajectory graph 706 can be generated in real-time and/or post-processed. For example, in FIG. 7, a user is detected in a room 1 of a building 800 (illustrated in FIG. 8). Then, the user is detected on a stairway of the building 800 (illustrated in FIG. 8). Then, the user is detected in a room 2 of the building 800 (illustrated in FIG. 8). This movement throughout the building can be identified as part of a re-identification process and recorded in the trajectory graph 706 for building a re-identification video that tracks the movements of the user.

In some embodiments, as the detections are made, e.g., an identification of a specific user and/or region of interest in an image, the generator 704 generates the graph 706. For example, the generator 704 can first generate the node 708 to indicate that the user was first detected in the room 1 by the video camera of room 1. Then, an edge 714 and a new node 710 can be generated indicating that a video camera of a stairway detected the user. Finally, an edge 716 and a new node 712 can be generated indicating that entity was detected in the room 2 by the video camera of the room 2.

In some embodiments, the graph generator 704 uses spatial data of the building graph 606 to determine what video clips of the building should be analyzed next after detecting a user in a video or image. For example, if the user is detected in room 1 via images or videos of a camera of the room 1, the generator 704 may identify, via the building graph 606, that the room 1 is connected to a stairway. Accordingly, the building graph 606 can analyze the camera of the stairway once the entity is no longer detected in the video camera of room 1. If the user is detected in the stairway, the generator 704 can generate the edge 714 and the node 710.

Furthermore, the building graph 606 can indicate that the stairway leads to a second room. The graph generator 704 can analyze video data of a video camera of the second room to determine if the entity is detected in the second room. Responsive to detecting the user, the edge 716 and the node 712 can be generated. The resulting trajectory graph 706 can be used to select the appropriate video clips. The order in which the nodes are generated can based on the order in which the video clips should be stitched. In some embodiments, the manager 602 follows the directional arrows of the trajectory graph 706 to determine the order in which to stitch together the video clips.

In some embodiments, the generator 704 can generate the graph 706 based on temporal information, e.g., camera time. The camera videos can be ordered based on the shortest time between camera detections. Furthermore, the nodes may track the user from the first time at which the user is detected in the facility to the last time that the user is detected in the facility.

In some embodiments, the trajectory graph 706 also records timestamp nodes related to each video camera node by one or more edges. The timestamp nodes can indicate a beginning or end at which the user is detected by videos or images of each camera. The generator 616 can generate the video 620 based on the video cameras of the trajectory graph 706 and the timestamps of each node.

Figure 9:
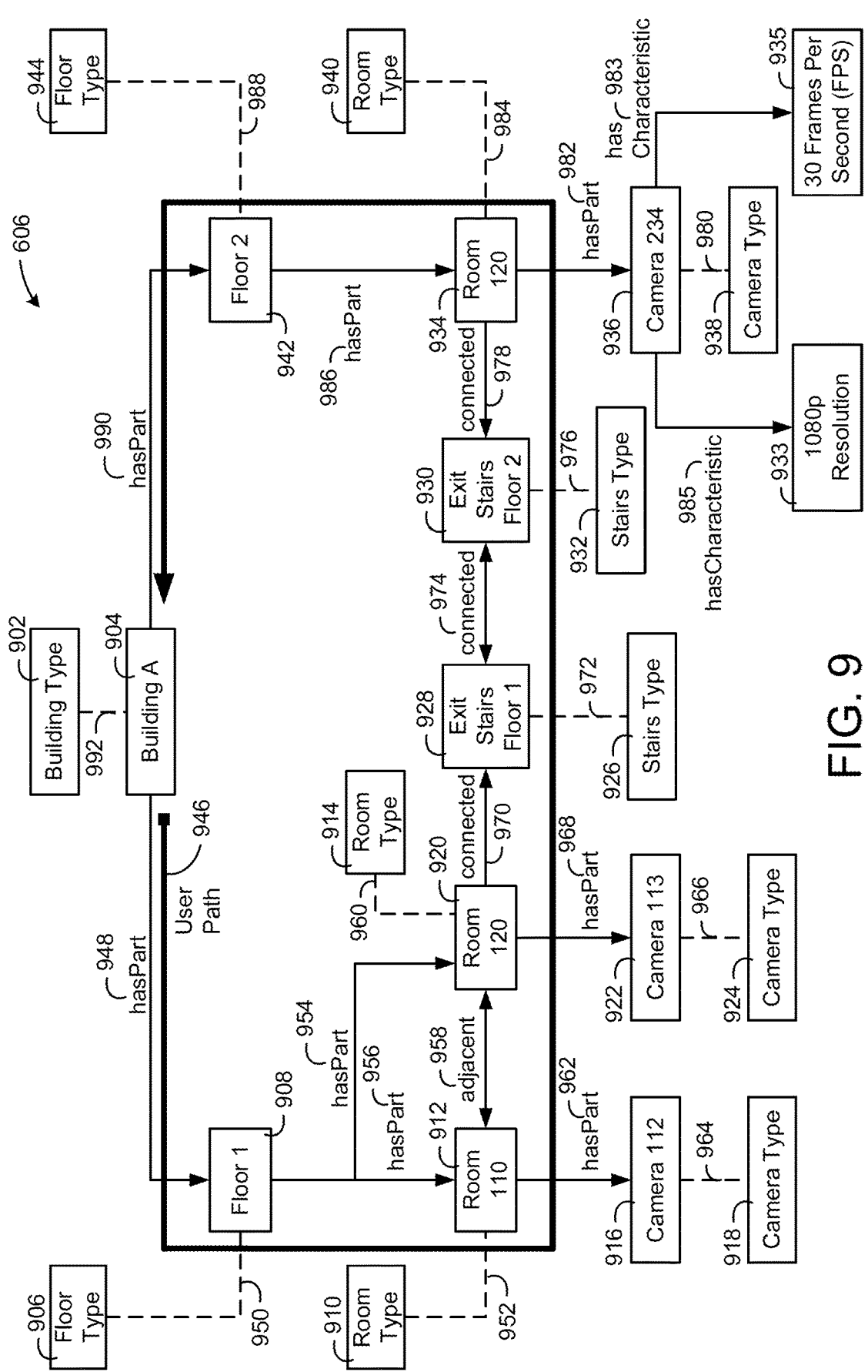
FIG. 9 is a block diagram of the building graph of FIG. 6, the building graph including nodes and edges representing physical spaces of a building and cameras for the physical spaces of the building, according to an exemplary embodiment.

Referring now to FIG. 9, the building graph 606 including nodes 902-944 and edges 948-992 representing physical spaces of a building and cameras for the physical spaces of the building is shown, according to an exemplary embodiment. FIG. 9 includes a path 946 illustrating a path that a user took through a building. The path 946 is overlaid on top of the graph 606 for illustrative purposes and is not part of the graph 606, in some embodiments. In some embodiments, the path 946 is stored in the graph 606.

The graph 606 includes a building A node 904. The node 904 is a type of building and is thus related by the edge 992 to the building type node 902. The building A node 904 has a floor 1 represented by a floor 1 node 908 and the "hasPart" edge 948 from the building A node 904 to the floor 1 node 908. The floor 1 has a room 110 and a room 120 indicated by the room 110 node 912 and the room 120 node 920 related to the floor 1 node 908 by the "hasPart" edge 954 and the "hasPart" edge 956. The rooms 110 and 120 are both room and thus the room 110 node 912 is related to a room type node 910 via the edge 952 and the room 120 node 920 is related to a room type node 914 via the edge 960. The floor 1 represented by node 908 can be a floor type and thus the node 908 can be related to a floor type node 906 by an edge 950.

The room 110 includes a camera 112 that surveils the room 110. This is indicated by the room 110 node 912 being related to the camera 112 node 916 via a "hasPart" edge 962. The room 120 includes a camera 113. This is indicated by the room 120 node 920 being related to a camera 113 node 922 via a "hasPart" edge 968. The cameras 112 and 113 are both cameras and thus the nodes 916 and 922 are related to camera type nodes 918 and 924 via the edges 964 and 966 respectively.

The room 120 is connected to exit stairs for floor 1 indicated by the room 120 node 920 being related to the exit stairs floor 1 node 928 via the "connected" edge 970. The stairs are of a stairs type and thus the node 928 is related to the stairs type node 926 via an edge 972. The exit stairs of floor 1 have an exit on a floor 2 indicated by the node 928 being related to an exit stairs floor 2 node 930 via an edge 974. The building A includes a second floor indicated by the node 904 being related to a floor 2 node 942 via the "hasPart" edge 990. The floor 2 node 942 is related to a floor type node 944 via an edge 988 to indicate that the node 942 represents a floor.

The floor 2 includes a room 120 indicated by the node 942 being related to a room 120 node 934 via a "hasPart" edge 986. The room 120 node 934 is connected to the exit stairs of floor 2 node 930 via the "connected" edge 978. The room 120 node 934 is connected to a room type 940 via an edge 984. The node 930 is related to a stairs type node 932 via an edge 976.

The room 120 includes a camera 234 indicated by the "hasPart" edge 982 from the node 934 to the node 936. The camera 234 can include various camera characteristics, e.g., a resolution of 1080p and a frame rate of 30 frames per second (FPS). The camera 234 node 936 is linked to a 1080p resolution node 933 via a "hasCharacteristic" edge 985. The camera 234 node 936 includes a frame rate, indicated by the node 936 being related to a 30 FPS node 935 via a "hasCharacteristic" edge 983. The camera 234 represented by the node 936 can be a camera type node. Thus, the node 936 can be related to the camera type node 938 by an edge 980.

In some embodiments, the user is detected on the floor 1 in the room 110 via the camera 112. As the user moves out of the room 110, the manager 602 may identify that the next camera feed to check for the user would be camera 113. This may be identified by the manager 602 since there is only one connection to another space for the room 110, i.e., the room

120. This can be identified by the "adjacent" edge 958 between the room 110 node 912 and the room 120 node 920.

If the user is identified in the video feed of camera 113 but the user again moves out of the room 120, the manager 602 can identify that the next locations that the user could move to would be the room 110 or the room 120 based on the relationships of the graph 606 between the room 120 node 920 and the room 110 node 912 and the room 120 node 934. In some embodiments, the manager 602 can detect in a video feed of the camera 113 that the user has moved into an exit stairs shown in the video. This determination can be used by the manager 602 to identify that the exit stairs of the video is the exit stairs floor 1 which leads to the room 120 via the edge 974, the node 930, and the edge 978. Responsive to this determination, the manager 602 can analyze the video feed of the camera 234 of the room 120 to detect the user in the room 120.

In some embodiments, the aforementioned tracking of the user through the room 110, to the room 120 of the floor 1 to the room 120 of the floor 2 (e.g., the detection of the user in camera 112, 113, and then 234) can be recorded in a trajectory graph 706 for constructing the video 620. In some embodiments, the spatial context provided by the graph 606 is used by the manager 618 to track the movements of an entity through a building, i.e. perform re-identification to generate the trajectory graph 706.

Figure 10:
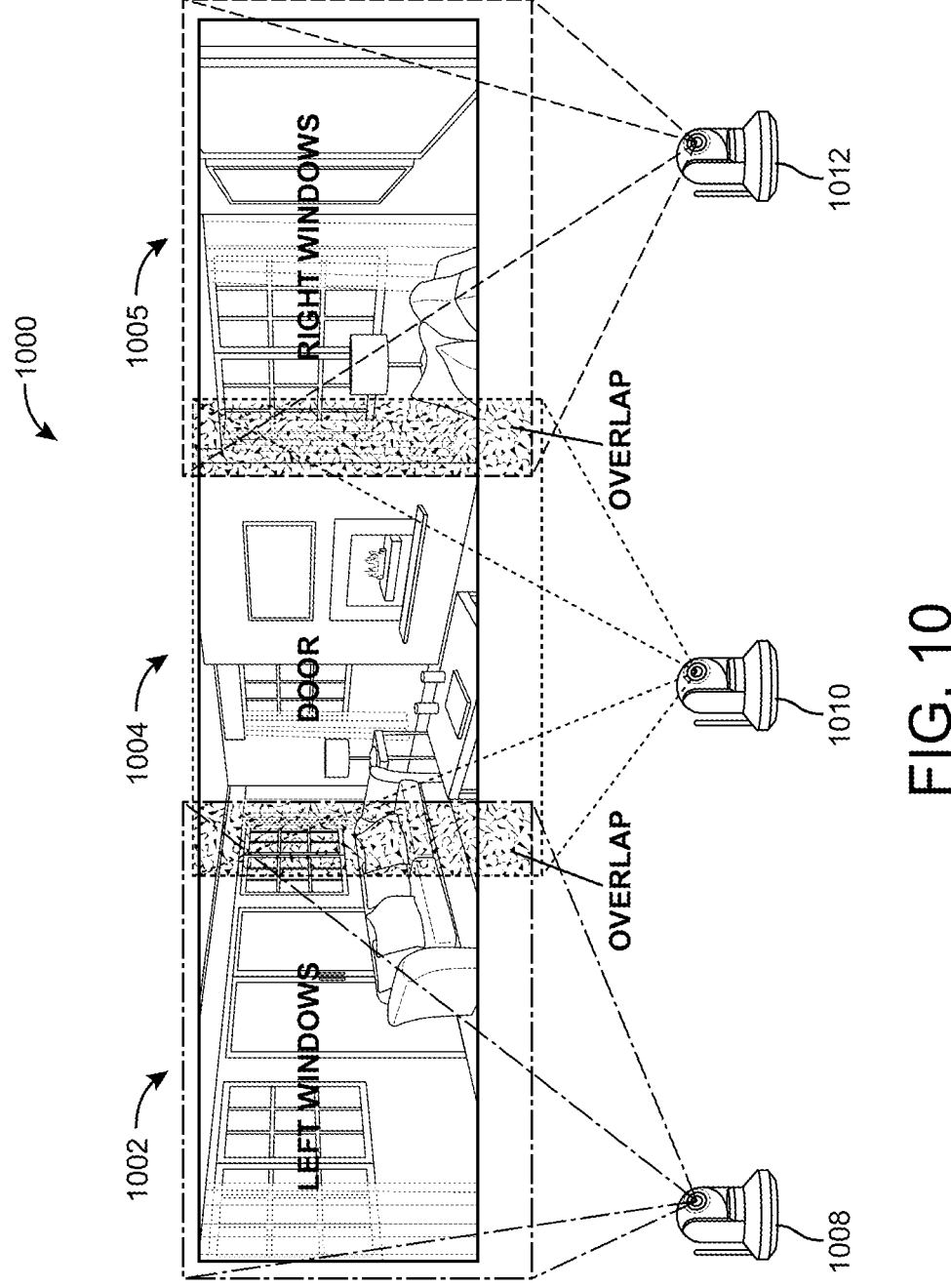
FIG. 10 is a schematic drawing of fields of view of multiple cameras of a building, where the fields of view can be used to make corrections to the trajectory graph of FIG. 7, according to an exemplary embodiment.

Referring now to FIG. 10, a schematic drawing 1000 of fields of view 1002-1006 of multiple cameras 1008-1012 of a building is shown, where the fields of view 1002-1006 can be used to make corrections to the trajectory graph 706, according to an exemplary embodiment. In some cases, a re-identification search of an entity is negatively impacted by various factors including improper mounting of security cameras. Ideally, security cameras are strategically placed to capture entities at their best possible views by maximizing the coverage area and capturing front views of entities.

In most situation, entities should pass across a specific camera before crossing other cameras. For example in FIG. 10, an entity crossing camera 1008 and camera 1012 should cross camera 1010. This spatial relationship between the cameras 1008-1012 can be derived from the building graph 606. If a constructed entity path trajectory (e.g., trajectory graph 706) has an entity detected in the field of view 1002 of camera 1008 and then the field of view 1006 of camera 1012 but not the field of view 1004 of camera 1010, the entity may be missed in the space filmed by the camera 1010 in the re-identification.

In such a situation where the trajectory of an entity skips a camera that the entity should have been detected in, the trajectory can be corrected, e.g., the generator 704 can correct the trajectory graph 706. In such a situation, path correction can include adding the camera 1010 to the trajectory between the detections of the entity in the camera 1008 and the camera 1012.

In some embodiments, the clip time for the camera 1010 can be calculated by estimating an entity velocity from the camera 1008 to the camera 1012. In some embodiments, a distance between the cameras 1008 and the camera 1012 can be extracted from the building graph 606. For example, the camera 1008 can cover ten meters of space, i.e., have a camera field of view (e.g., stored by the building graph 606) that is ten meters wide. The time it takes the entity to move across the camera 1008 field of view 1002 may be ten seconds. Based on the distance of the field of view and the speed it takes the entity to move through the camera, an estimated velocity of the entity may be calculated, e.g., calculated to be 1 meter/sec (2.23 m/h) from left to right.

The time an entity reached camera 1008, the predicted speed the entity, and the distance between camera 1008 and camera 1010 may be stored in the building graph 606. With this information, the time at which the entity reaches the field of view 1004 (and/or leaves the field of view 1004) of camera 1010 can be determined by the re-identification manager 602. The corresponding video clip (cross verified by motion detection of camera freely available in most surveillance cameras) can be added to re-identification video, e.g., the video 620.

In some embodiments, the graph 606 stores probability data on the edges of the graph, e.g., on edges connecting multiple space nodes. The probability data can indicate an average time that it takes occupants to move from a first space to a second space. For example, an edge from a first space node to a second space node can indicate a probability of a length of time it takes to travel from the first space to the second space. In some embodiments, the probability data is a probability distribution of travel times between the spaces. The distribution can could indicate the lengths of times it takes various people to walk from the first space to the second space. For example, "on average, it takes 15 seconds to walk this hallway, but 20% of people do it 10 seconds and the slowest 20% take 35 seconds." In some embodiments, the generator 704 can build and/or correct a trajectory (e.g., the trajectory graph 706) based on the probability data.

In some embodiments, the graph storing probability data can be calculated from video data, Wi-Fi tracking data, and/or Bluetooth tracking data. A user can carry a smartphone and/or other tracking tag that the Wi-Fi tracking system and/or the Bluetooth tracking system can track. In some embodiments, the average travel times and/or travel time error for a space or between spaces (e.g., a hallway). In some embodiments, the trajectory graph can use one or multiple data sources when compiling predictions of when a person reappears in a video feed of a camera of a space after leaving the video feed of a camera of another space.

In some embodiments, the generator 704 can identify possible routes of a user and order the possible routes of the user based on a joint probability distribution. In some embodiments, the generator 704 can combine multiple probability distributions indicated by the graph into a joint probability distribution for each route. In some embodiments, the generator 704 includes a ranking function that generates multiple routes, generates a joint probability distribution for each route, and orders the routes based on which routes are the most likely to have occurred. For example, if the graph indicates that a hallway hits a "T" junction and turns left and right, the generator 704 can generate a first distribution that the user goes down the hallway and turns left and a second distribution that the user goes down the hallway and turns right. The generator 704 can rank the distributions based on which route is more likely.

Referring now to FIG. 11, a process 1100 of generating a video tracking an entity within the building by joining multiple videos of multiple cameras together based on the building graph 606 is shown, according to an exemplary embodiment. The process 1100 can be performed by the re-identification manager 602. Furthermore, any computing device as described herein can be configured to perform the process 1100.

In step 1102, the manager 602 receives a request to generate a video of an entity traveling through a building. The manager 602 can receive a manual request from a user to track a particular region of interest in an image and/or video of the building cameras 604. The request can be provided to the manager 602 from the user device 176. In some embodiments, the request is based on a detection of a security event by the detector 614, e.g., a detection of a person shoplifting, a person being detected in a restricted area, etc.

In step 1104, the manager 602 identifies video clips of video data of multiple cameras of a building based on data of the building graph 606. The building graph 606 can provide spatial data that relates various spaces of a building and/or the multiple cameras together. The building graph 606 can include multiple nodes representing the spaces of the building and/or the cameras of the building. The building graph 606 can include edges that relate the various nodes to illustrate which spaces lead to other spaces and which cameras capture images and/or videos for which spaces.

In some embodiments, the manager 602 uses the spatial data of the building graph 606 to determine which video feeds to analyze to detect the entity. For example, if the entity is detected in a first room and the graph 606 indicates that the first room leads to a second room, the manager 602 can determine that a video camera of the second room should be analyzed at a time when the user leaves the first room.

In some embodiments, the manager 602 analyzes the video and/or images of the cameras based on the spatial data of the building graph 606 and records a trajectory of the user, e.g., the trajectory graph 706. The manager 602 can use the trajectory graph 706 to select various video clips in a particular order that track the entity throughout the building.

In step 1106, the video clips identified in the step 1104 can be joined into a re-identification video, e.g., the video 620. In some embodiments, the order in which the videos are combined is based on the trajectory graph 706. In step 1108, the re-identification video can be provided to a user for viewing, e.g., provide the video to the user device 176.

Referring now to FIG. 12, a process 1200 of generating the trajectory graph 706 that tracks the movements of a user through a building is shown, according to an exemplary embodiment. The process 1200 can be performed by the re-identification manager 602 and/or the entity trajectory manager 618. Furthermore, any computing device as described herein can be configured to perform the process 1200.

In step 1202, the manager 618 receives videos and/or images of the building cameras 604. The videos and/or images can be stored in the camera data storage 612. In step 1204, the manager 618 can identify a particular entity to perform a re-identification process on to track the and join multiple video clips and/or images of the building cameras into a single video, a re-identification video. The entity can be detected in a first video feed of a first camera.

In step 1206, the manager 618 can identify a space that the entity is within based on a building graph 606 that indicates a relationship between the first camera and the space. For example, the first camera may be represented as a first node in the building graph 606 and an edge can be included within the building graph 606 between the first node and a second node of the building graph 606 representing the space.

In step 1208, the manager 618 generates a node representing the first camera for the trajectory graph 706. In some embodiments, the manager 618 generates an edge between the node and another node representing another camera that previously captured an image of the entity. This trajectory graph 706 can form a path of cameras that detect the user or capture images or videos including the user, e.g., trace the user through the building.

In step 1210, the manager 618 determines a next video feed of the video feeds to review of a second space by identifying that the space identified in the step 1206 leads to the second space based on the building graph 606. The manager 618 can determine that the building graph 606 includes a node representing the second space and another node representing the space, where the two nodes are related by an edge in the building graph 606. The second space may have a second camera, indicated by the building graph 606. The process 1200 can return to the step 1204 to analyze the feed of the second camera. Once the user departs the building, the process can proceed to step 1212, step 1214, and/or step 1216. Steps 1212 and 1214 are shown in dashed lines to represent that the steps 1212 and 1214 are optional steps.

In step 1212, the manager 618 can perform a path correction for the trajectory graph 706 based on the building graph 606. In some embodiments, the manager 618 can compare the trajectory graph 706 to the building graph 606. For example, the building graph 606 can indicate that one or more cameras should have picked up video of the user based on the trajectory of the user in the trajectory graph 706. In this regard, the manager 618 can insert a node into the trajectory graph 706 that represents a camera that should have picked up the video. In some embodiments, a start time and an end time of a video clip for the camera to be added to the joined videos can be predicted based on a speed of the occupant and the positions of the cameras.

In step 1214, the manager 618 can recommend one or more camera placement improvements that can be made based on the detection to perform path correction in the step 1212. In some embodiments, the manager 618 can record how many times each camera is involved in a correction to the trajectory of the user. If corrections are not required frequently for a camera, it implies that the camera is placed properly and other factors such as occlusion, motion blur, etc. are not issues. If corrections are required often for a camera, this implies that the camera is not placed properly. If a camera frequently needs to be injected into the trajectory, e.g., more than a particular number in a time window (e.g., five times in a thirty day period), the manager 618 can generate one or more recommendations for improving the positioning of the camera, moving objects to stop occlusion issues, correcting motion blur issues, etc. In some embodiments, the recommendations can be transmitted by the manager 618 to a BAS, BMS, the user device 176, etc.

In step 1216, the manager 618 can join images and/or videos of the video cameras of the building cameras 604 into the video 620 based on the trajectory graph 706. The trajectory graph 706 can identify the cameras which to stitch feeds together, beginning and ending timestamps for each camera feed, the order in which to stitch the feeds, etc.

Referring now to FIG. 13, a process 1300 of normalizing video clips of multiple videos based on characteristics of cameras stored in the building graph 606 is shown, according to an exemplary embodiment. The process 1300 can be performed by the normalizer 622. Furthermore, any computing device as described herein can be configured to perform the process 1300.

Videos from different cameras may need to be normalized before they are joined into a single video. For example, one camera video may be a full HD video while another camera video may be a 2K resolution video from. These videos can be combined into either a full HD video (e.g., down sample the 2K resolution) or a 2K resolution video (e.g., up-sample the full HD video). Furthermore, if one video is brighter and another video is darker, brightness may need to be normalized. In some cases, if one camera is 45 degree and another is 30 degree, combining their videos may have parallax issues.

In step 1302, the normalizer 622 can receive multiple video clips of video data from multiple cameras to be joined into a single video, e.g., receive the clips of the video 620 to be normalized and joined into the video 624. The clips can be the clips of the video 620 received from the generator 616.

In step 1304, the normalizer 622 can retrieve camera characteristics of the multiple cameras from the building graph 606. In some embodiments, the normalizer 622 can identify the cameras used in generating the clips received in the step 1302. The normalizer 622 can identify nodes in the building graph 606 representing the cameras. The building graph 606 can further include nodes related to the camera nodes via edges. The normalizer 622 can retrieve the nodes representing the characteristics of the cameras. The characteristics include resolution, field of view, placement of camera (e.g., height, camera angle, horizontal tilt, vertical tilt, etc.), FPS, brightness, contrast, white balance, exposure, etc.

In step 1306, the normalizer 622 can normalize the video clips to have common characteristics based on the characteristics retrieved in the step 1304. In some embodiments, the normalizer 622 can normalize the video clips to a lowest resolution and/or normalize the video clips to an average resolution. Similarly, the normalizer 622 could up-sample and/or down sample videos to have a common FPS, e.g., up-sample to a highest FPS in the videos, down sample to a lowest FPS in the videos, up-sample and/or down sample to an average FPS, etc. In some embodiments, based on field of view and camera angle difference between any two adjacent source videos (cameras) in the path, the normalizer 622 can apply a pre-calibrated homogeneous matrix transform over source videos to form the video 624. In step 1308, the normalizer 622 can join the multiple video clips into a single video, e.g., the video 624. In step 1310, the video 624 can be provided to the user device 176 for review by a user.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed:

1. A building system of a building comprising one or more memory devices storing instructions thereon that, when executed by one or more processors, cause the one or more processors to:

receive a request to generate a video tracking movement of an entity throughout the building;

search, based on a graph database for the building, a video database for a set of images or videos of a plurality of cameras of the building that track the entity throughout the building, the graph database for the building comprising a plurality of nodes indicating a plurality of spaces of the building and the plurality of cameras of the building, the graph database for the building comprising a plurality of edges between the plurality of nodes representing semantic relationships between the plurality of spaces and the plurality of cameras;

identify a set of cameras of the plurality of cameras associated with the set of images or videos;

identify a set of nodes of the graph database for the building representing the set of cameras;

identify camera characteristics of the set of cameras by identifying edges of the plurality of edges linking the set of nodes to nodes representing the camera characteristics;

normalize the set of images or videos based on the camera characteristics of the set of cameras; and join the set of images or videos together to create the video.

2. The building system of claim 1, wherein at least some of the plurality of nodes indicate equipment, people, or events of the building;

wherein at least some of the plurality of edges represent relationships between the equipment, the people, or the events of the building.

3. The building system of claim 1, wherein the instructions cause the one or more processors to:

generate a trajectory graph based on the graph database for the building and a plurality of images or videos of the video database, the trajectory graph indicating a path of the entity through the building, the trajectory graph including a plurality of nodes and a plurality of edges, wherein the plurality of nodes represent the plurality of cameras that captured pictures of the entity or filmed the entity, the plurality of edges indicating an order in which the plurality of cameras captured the pictures of the entity or filmed the entity; and search the video database for the set of images or videos based on the trajectory graph.

4. The building system of claim 1, wherein the request to generate the video tracking movement of the entity throughout the building is at least one of:

a user request of a user device requesting the video tracking movement of the entity throughout the building be generated; or a request generated responsive to a security event involving the entity occurring within the building.

5. The building system of claim 1, wherein the instructions cause the one or more processors to:

search the video database for the set of images or videos of the plurality of cameras of the building by:

identifying one or more first videos or images of a first camera of the plurality of cameras stored in the video database, the one or more first videos or images including the entity, the first camera surveilling a first space of the building;

identifying a second space of the building connected to the first space based on the graph database for the building;

identifying a second camera of the plurality of cameras surveilling the second space of the building based on the graph database for the building;

selecting one or more second videos or images of the second camera stored in the video database responsive to identifying the second camera; and identifying the entity within the one or more second videos or images of the second camera indicating that the entity moved from the first space to the second space; and join the one or more first videos or images and the one or more second videos or images to create the video.

6. The building system of claim 5, wherein the instructions cause the one or more processors to:

generate a trajectory graph by:

causing the trajectory graph to include a first node representing the first camera of the plurality of cameras in response to identifying the one or more first videos or images of the first camera of the plurality of cameras including the entity; and causing the trajectory graph to include a second node and an edge between the first node and the second node indicating that the entity has moved from a field of view of the first camera to a field of view of the second camera in response identifying the entity is within the one or more second videos or images of the second camera.

7. The building system of claim 6, wherein the instructions cause the one or more processors to:

identify, based on the graph database for the building, a camera not represented in the trajectory graph that includes a field of view that captures a portion of a path the entity traveled on;

update the trajectory graph to include a node representing the camera; and join the set of images or videos together with images or videos of the camera to create the video.

8. The building system of claim 7, wherein the instructions cause the one or more processors to:

determine at least one of a starting time or an ending time for the images or videos by:

identifying a speed of the entity based on a length of time the entity takes to move across at least a portion of the field of view of the first camera; and determining at least one of the starting time or the ending time based on the speed of the entity.

9. A method, comprising:

receiving, by one or more processing circuits, a request to generate a video tracking movement of an entity throughout a building;

searching, by the one or more processing circuits, based on a graph database for the building, a video database for a set of images or videos of a plurality of cameras of the building that track the entity throughout the building, the graph database for the building comprising a plurality of nodes indicating a plurality of spaces of the building and the plurality of cameras of the building, the graph database for the building comprising a plurality of edges between the plurality of nodes representing semantic relationships between the plurality of spaces and the plurality of cameras;

identifying, by the one or more processing circuits, a set of cameras of the plurality of cameras associated with the set of images or videos;

identifying, by the one or more processing circuits, a set of nodes of the graph database for the building representing the set of cameras;

identifying, by the one or more processing circuits, camera characteristics of the set of cameras by identifying edges of the plurality of edges linking the set of nodes to nodes representing the camera characteristics;

normalizing, by the one or more processing circuits, the set of images or videos based on the camera characteristics of the set of cameras; and joining, by the one or more processing circuits, the set of images or videos together to create the video.

10. The method of claim 9, wherein at least some of the plurality of nodes indicate equipment, people, or events of the building;

wherein at least some of the plurality of edges represent relationships between the equipment, the people, or the events of the building.

11. The method of claim 9, comprising:

generating, by the one or more processing circuits, a trajectory graph based on the graph database for the building and a plurality of images or videos of the video database, the trajectory graph indicating a path of the entity through the building, the trajectory graph including a plurality of nodes and a plurality of edges, wherein the plurality of nodes represent the plurality of cameras that captured pictures of the entity or filmed the entity, the plurality of edges indicating an order in which the plurality of cameras captured the pictures of the entity or filmed the entity; and searching, by the one or more processing circuits, the video database for the set of images or videos based on the trajectory graph.

12. The method of claim 9, wherein the request to generate the video tracking movement of the entity throughout the building is at least one of:

a user request from a user device requesting the video tracking movement of the entity throughout the building be generated; or a request generated responsive to a security event involving the entity occurring within the building.

13. The method of claim 9, comprising:

searching, by the one or more processing circuits, the video database for the set of images or videos of the plurality of images or videos of the plurality of cameras of the building by:

identifying one or more first videos or images of a first camera of the plurality of cameras stored in the video database, the one or more first videos or images including the entity, the first camera surveilling a first space of the building;

identifying a second space of the building connected to the first space based on the graph database for the building;

identifying a second camera of the plurality of cameras surveilling the second space of the building based on the graph database for the building;

selecting one or more second videos or images of the second camera stored in the video database responsive to identifying the second camera; and identifying the entity within the one or more second videos or images of the second camera indicating that the entity moved from the first space to the second space; and joining, by the one or more processing circuits, the one or more first videos or images and the one or more second videos or images to create the video.

14. The method of claim 13, comprising:

generating, by the one or more processing circuits, a trajectory graph by:

causing the trajectory graph to include a first node representing the first camera of the plurality of cameras in response to identifying the one or more first videos or images of the first camera of the plurality of cameras including the entity; and causing the trajectory graph to include a second node and an edge between the first node and the second node indicating that the entity has moved from a field of view of the first camera to a field of view of the second camera in response identifying the entity is within the one or more second videos or images of the second camera.

15. A system comprising one or more memory devices storing instructions thereon that, when executed by one or more processors, cause the one or more processors to:

receive a request to generate a video tracking movement of an entity throughout an environment;

search, based on a digital twin of the environment comprising a graph database, a video database for a set of images or videos of a plurality of cameras of the environment that track the entity throughout the environment, the graph database of the digital twin representing areas of the environment and the plurality of cameras of the environment, the graph database of the digital twin representing semantic relationships between the areas and the plurality of cameras;

identify a set of cameras of the plurality of cameras associated with the set of images or videos;

identify a set of nodes of the graph database of the digital twin representing the set of cameras;

identify camera characteristics of the set of cameras by identifying one or more relationships of the graph database of the digital twin linking the set of nodes to nodes representing the camera characteristics;

normalizing the set of images or videos based on the camera characteristics of the set of cameras; and join the set of images or videos together to create the video.

16. The system of claim 15, wherein the instructions cause the one or more processors to:

search the video database for the set of images or videos of the plurality of images or videos of the plurality of cameras of the environment by:

identifying one or more first videos or images of a first camera of the plurality of cameras stored in the video database, the one or more first videos or images including the entity, the first camera surveilling a first area of the environment;

identifying a second area of the environment connected to the first area based on the graph database of the digital twin;

identifying a second camera of the plurality of cameras surveilling the second area of the environment based on the graph database of the digital twin;

selecting one or more second videos or images of the second camera stored in the video database responsive to identifying the second camera;

identifying the entity within the one or more second videos or images of the second camera indicating that the entity moved from the first area to the second area; and join the one or more first videos or images and the one or more second videos or images to create the video.

17. The system of claim 15, wherein the instructions cause the one or more processors to:

generate a trajectory graph based on the graph database of the digital twin and a plurality of images or videos of the video database, the trajectory graph indicating a path of the entity through the environment, the trajectory graph including a plurality of nodes and a plurality of edges, wherein the plurality of nodes represent the plurality of cameras that captured pictures of the entity or filmed the entity, the plurality of edges indicating an order in which the plurality of cameras captured the pictures of the entity or filmed the entity; and search the video database for the set of images or videos based on the trajectory graph.

* * * * *